US009743016B2

(12) United States Patent
Nestares et al.

(10) Patent No.: US 9,743,016 B2
(45) Date of Patent: Aug. 22, 2017

(54) TECHNIQUES FOR IMPROVED FOCUSING OF CAMERA ARRAYS

(71) Applicant: Intel Corporation, Santa Clara, CA (US)

(72) Inventors: Oscar Nestares, San Jose, CA (US); Kalpana Seshadrinathan, Santa Clara, CA (US); Dinesh Jayaraman, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 115 days.

(21) Appl. No.: 13/710,301

(22) Filed: Dec. 10, 2012

(65) Prior Publication Data

US 2014/0160319 A1 Jun. 12, 2014

(51) Int. Cl.
| | |
|---|---|
| H04N 5/262 | (2006.01) |
| H04N 5/225 | (2006.01) |
| H04N 5/232 | (2006.01) |
| H04N 5/247 | (2006.01) |

(52) U.S. Cl.
CPC ......... *H04N 5/262* (2013.01); *H04N 5/23212* (2013.01); *H04N 5/23251* (2013.01); *H04N 5/247* (2013.01)

(58) Field of Classification Search
CPC . H04N 5/247; H04N 13/0242; H04N 13/0282
USPC .......... 348/239, 218.1, 211.11, 345, 42, 154; 382/154
See application file for complete search history.

(56) References Cited

U.S. PATENT DOCUMENTS

| | | | | |
|---|---|---|---|---|
| 7,221,805 B1* | 5/2007 | Bachelder | .............. | G03B 13/36 348/208.12 |
| 8,243,191 B2* | 8/2012 | Uchida | ......................... | 348/353 |
| 2008/0094478 A1* | 4/2008 | Sato | ................... | H04N 5/23293 348/208.12 |
| 2008/0123938 A1* | 5/2008 | Kim | .............................. | 382/154 |
| 2012/0237193 A1* | 9/2012 | Kawarada | ....................... | 396/95 |
| 2012/0300095 A1* | 11/2012 | Sawada | ................ | H04N 5/2258 348/222.1 |
| 2012/0307155 A1* | 12/2012 | Gleicher | ............... | G06T 3/0093 348/581 |

(Continued)

OTHER PUBLICATIONS

Vaish et al., "Synthetic Aperture Focusing using a Shear-Warp Factorization of the Viewing Transform", Proc. Workshop on Advanced 3D Imaging for Safety and Security, (to appear in conjunction with CVPR 2005), San Diego, 8 pages.

(Continued)

*Primary Examiner* — Xi Wang

(57) ABSTRACT

Techniques for improved focusing of camera arrays are described. In one embodiment, for example, an apparatus may comprise a processor circuit and an imaging management module, and the imaging management module may be operable by the processor circuit to determine, for each of a plurality of candidate displacement factors for an image array comprising a plurality of images, a corresponding sharpness, determine an optimal displacement factor comprising a candidate displacement factor corresponding to a maximized sharpness, and transform the image array based on the optimal displacement factor. Other embodiments are described and claimed.

29 Claims, 16 Drawing Sheets

(56) References Cited

U.S. PATENT DOCUMENTS

2013/0169844 A1* 7/2013 Watts ................. G06T 5/006
                                                            348/239

OTHER PUBLICATIONS

Point Gray product literature webpage, copyright 2012, Point Gray Research, Inc.<http://www.ptgrey.com/products/profusion25/index.asp>, Feb. 28, 2013 (author unknown), 2 pages.
Lytro product literature webpage, Lytro, Inc.,(Oct. 19, 2011 legal update), <http://www.lytro.com>, downloaded, Feb. 28, 2013, (author unknown), 5 pages.

* cited by examiner

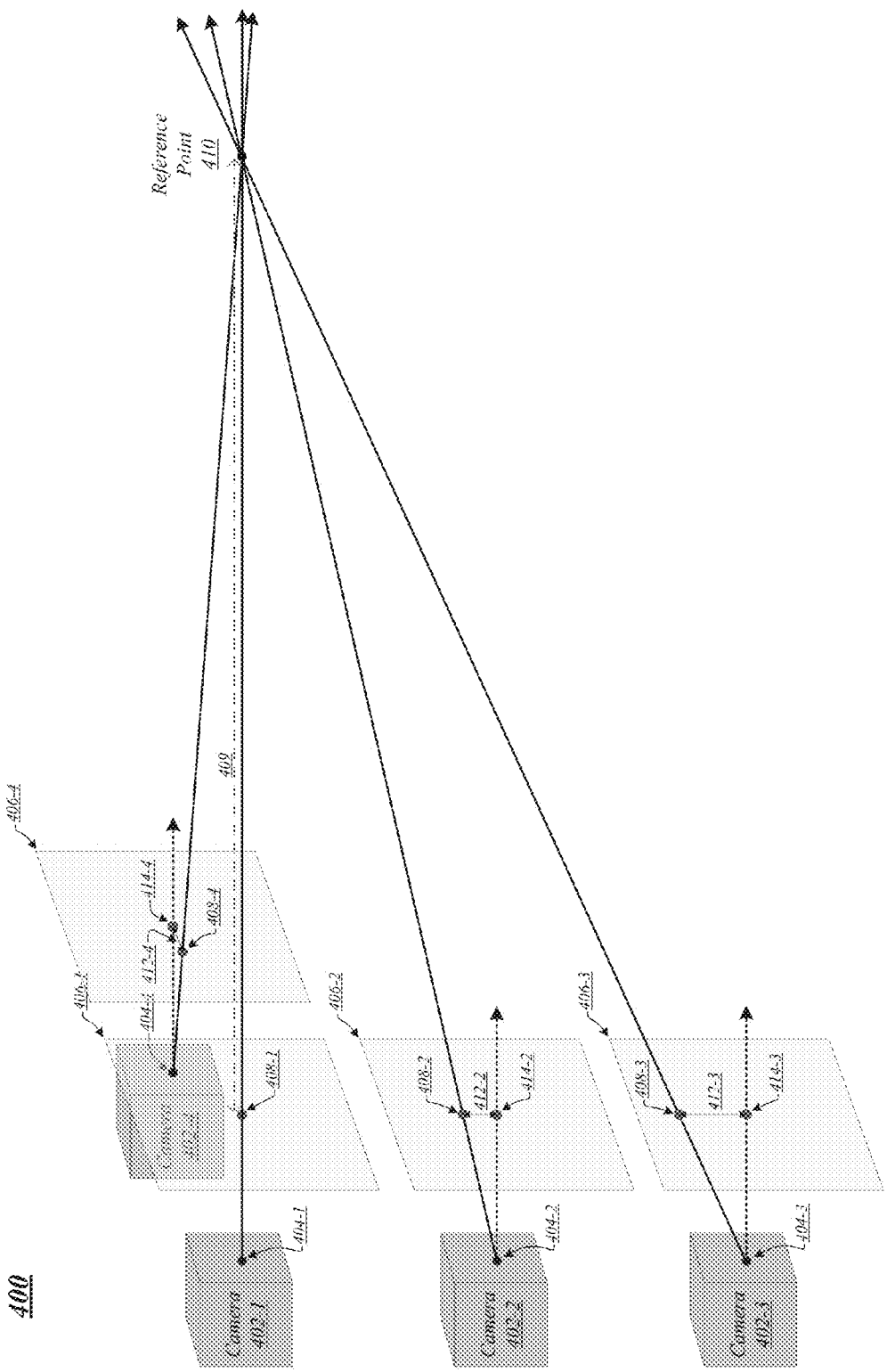

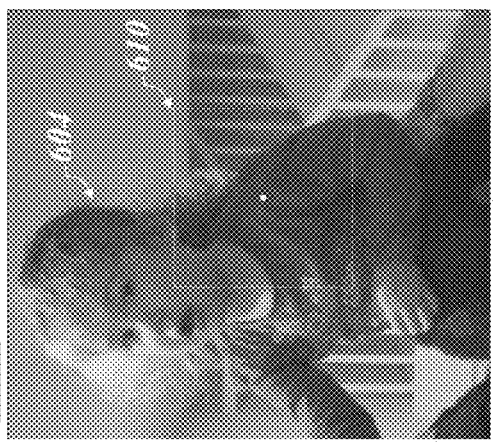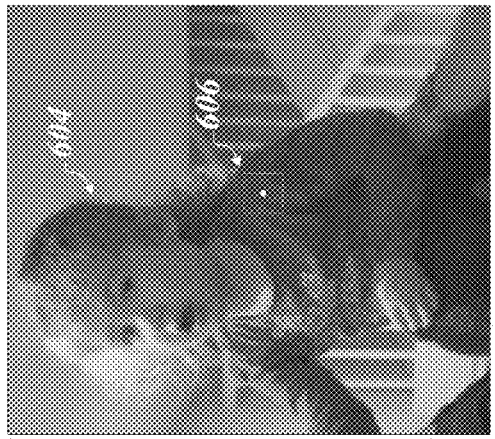
FIG. 6B

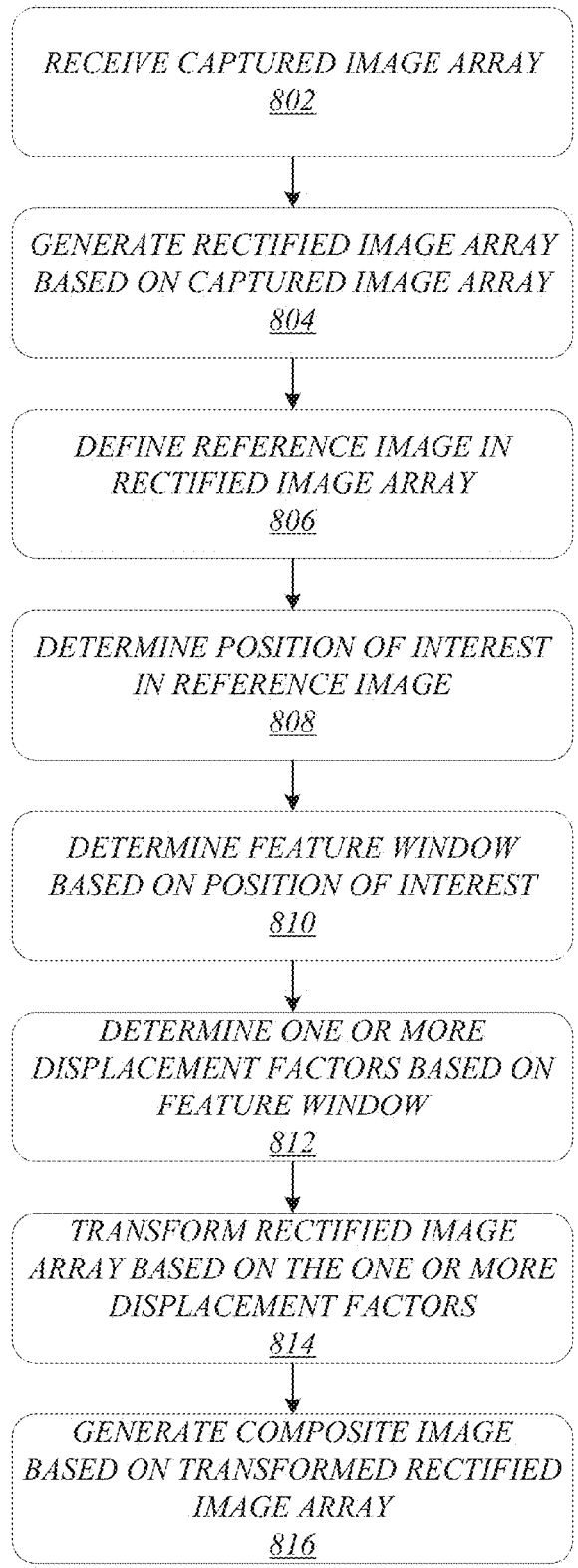

TECHNIQUES FOR IMPROVED FOCUSING OF CAMERA ARRAYS

BACKGROUND

In the field of image acquisition and processing, it may be desirable to generate a composite image based on a set of images captured by a two-dimensional camera array. Generating such a composite image may involve combining some or all of the captured images. Often, a user of a camera array may desire that in such a composite image, a region corresponding to a particular visual feature—such as a face, for example—be in focus. Focusing a particular composite image may involve transforming some or all of the captured images based in part on the depth of that visual feature with respect to the camera array. Under some circumstances, the depth of such a visual feature may not be known, and it may be undesirable to require that a user manually determine and input that depth. As such, techniques for focusing a region of a composite image without requiring knowledge of the focus depth may be desirable.

BRIEF DESCRIPTION OF THE DRAWINGS

FIG. 4 illustrates one embodiment of a second camera array.

FIG. 5B illustrates a second embodiment of the rectified image array.

FIG. 5C illustrates a third embodiment of the rectified image array.

FIG. 6B illustrates three embodiments of a candidate feature window.

FIG. 8 illustrates one embodiment of a first logic flow.

DETAILED DESCRIPTION

Various embodiments may be generally directed to techniques for improved focusing of camera arrays. In one embodiment, for example, an apparatus may comprise a processor circuit and an imaging management module, and the imaging management module may be operable by the processor circuit to determine, for each of a plurality of candidate displacement factors for an image array comprising a plurality of images, a corresponding sharpness, determine an optimal displacement factor comprising a candidate displacement factor corresponding to a maximized sharpness, and transform the image array based on the optimal displacement factor. In this manner, a composite image may be generated in which a particular desired region is in focus. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
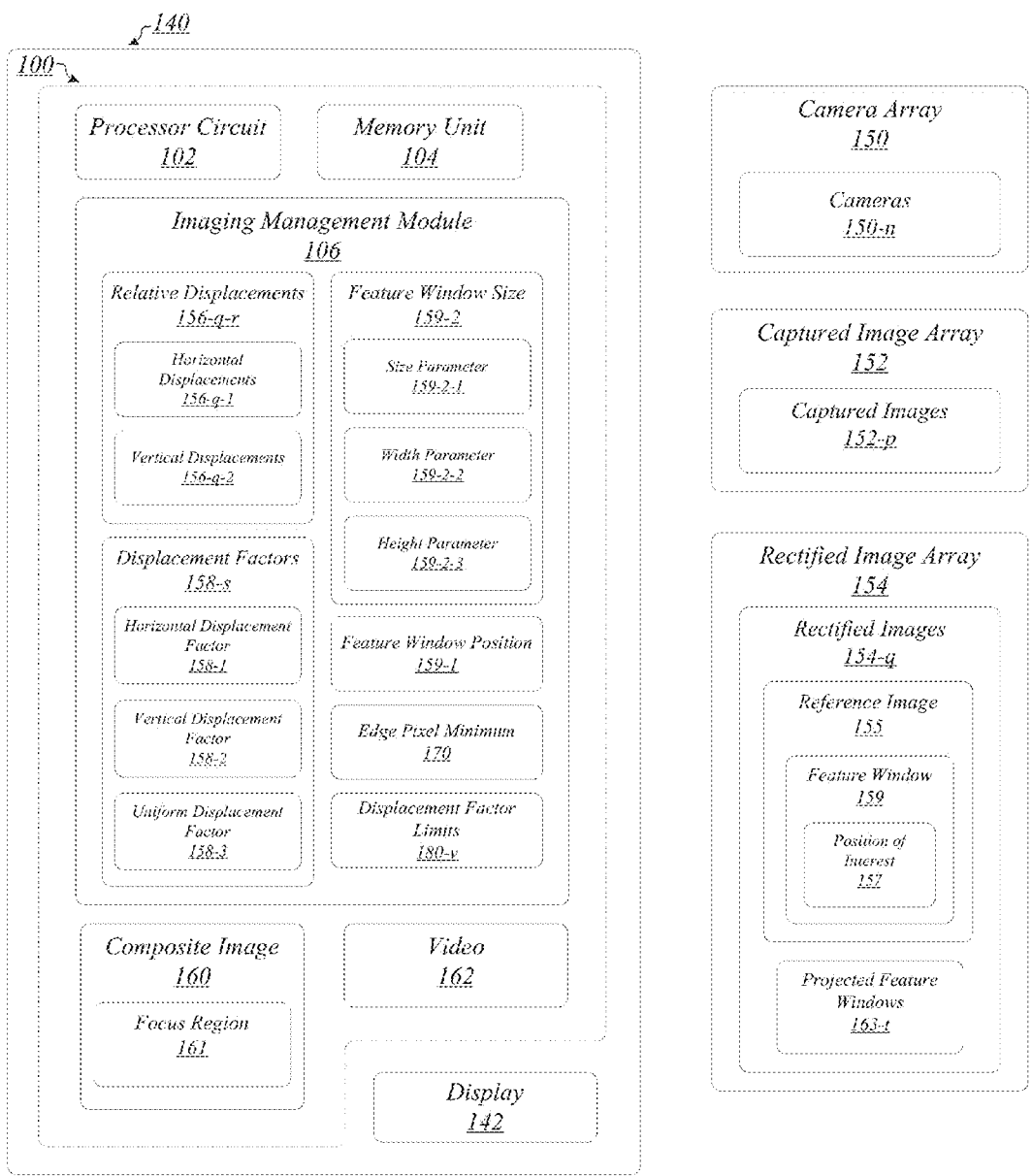
FIG. 1 illustrates one embodiment of an apparatus and one embodiment of a first system.

FIG. 1 illustrates a block diagram of an apparatus 100. As shown in FIG. 1, apparatus 100 comprises multiple elements including a processor circuit 102, a memory unit 104, and an imaging management module 106. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise or be arranged to communicatively couple with a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. Although memory unit 104 is comprised within apparatus 100 in FIG. 1, memory unit 104 may be external to apparatus 100 in some embodiments. The embodiments are not limited in this context.

In various embodiments, apparatus 100 may comprise an imaging management module 106. Imaging management module 106 may comprise logic, algorithms, and/or instructions operative to capture, process, edit, compress, store, print, and/or display one or more images. In some embodiments, imaging management module 106 may comprise programming routines, functions, and/or processes implemented as software within an imaging application or operating system. In various other embodiments, imaging management module 106 may be implemented as a standalone chip or integrated circuit, or as circuitry comprised within processor circuit 102 or within a graphics chip or other integrated circuit or chip. The embodiments are not limited in this respect.

FIG. 1 also illustrates a block diagram of a system 140. System 140 may comprise any of the aforementioned elements of apparatus 100. System 140 may further comprise a display 142. Display 142 may comprise any display device capable of displaying information received from processor circuit 102. Examples for display 142 may include a television, a monitor, a projector, and a computer screen. In one embodiment, for example, display 142 may be implemented by a liquid crystal display (LCD), light emitting diode (LED) or other type of suitable visual interface. Display 142 may comprise, for example, a touch-sensitive color display screen. In various implementations, display 142 may comprise one or more thin-film transistors (TFT) LCD including embedded transistors. In various embodiments, display 142 may be arranged to display a graphical user interface operable to directly or indirectly control imaging management module 106. For example, in some embodiments, display 142 may be arranged to display a graphical user interface generated by an imaging application implementing imaging management module 106. In such embodiments, the graphical user interface may enable operation of imaging management module 106 to capture, process, edit, compress, store, print, and/or display one or more images. The embodiments, however, are not limited to these examples.

In some embodiments, apparatus 100 and/or system 140 may be configurable to communicatively couple with a camera array 150. Camera array 150 may comprise a plurality of cameras 150-n. It is worthy of note that "n" and similar designators as used herein are intended to be variables representing any positive integer. Thus, for example, if an implementation sets a value for n=4, then a complete set of cameras 150-n may include cameras 150-1, 150-2, 150-3, and 150-4. It is worthy of note that although camera array 150 is illustrated as being external to apparatus 100 and system 140 in FIG. 1, in some embodiments, camera array 150 may be comprised within apparatus 100 and/or system 140. The embodiments are not limited in this context.

In various embodiments, camera array 150 may comprise a two-dimensional (2D) camera array. A 2D camera array may comprise a camera array in which the optical centers of the cameras therein are situated in—or approximately situated in—a common plane in three-dimensional space, and arranged in—or approximately arranged in—multiple rows and columns within their common plane. It is worthy of note that because the optical centers of the cameras within a 2D camera array may be situated approximately on—but not necessarily precisely on—the common plane, the actual arrangement of optical centers in a particular 2D camera array may be three-dimensional. The embodiments are not limited in this context.

Figure 2A:
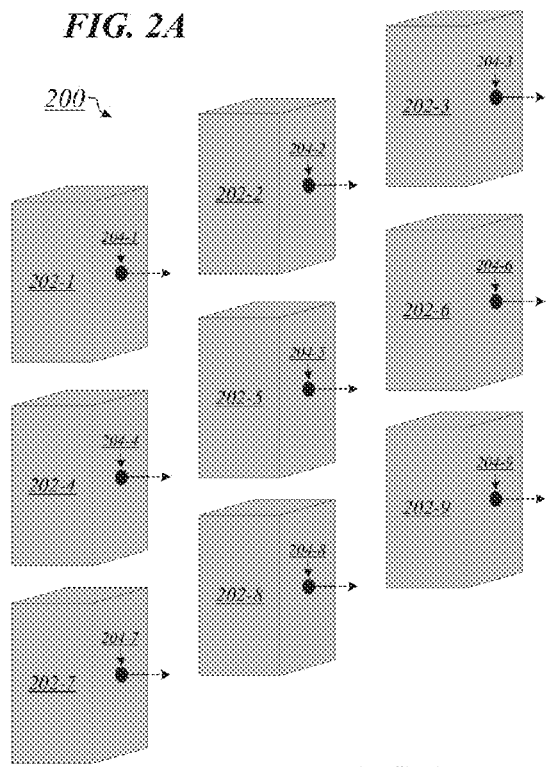
FIG. 2A illustrates one embodiment of a first camera array.

An example of a camera array 200 is illustrated in FIG. 2A. As shown in FIG. 2A, camera array 200 comprises nine cameras, labeled 202-1 to 202-9, oriented as illustrated by the dashed arrows included therein. Each camera 202-n in camera array 200 comprises a respective optical center 204-n. For example, camera 202-1 comprises an optical center 204-1. The embodiments are not limited to this example.

Figure 2B:
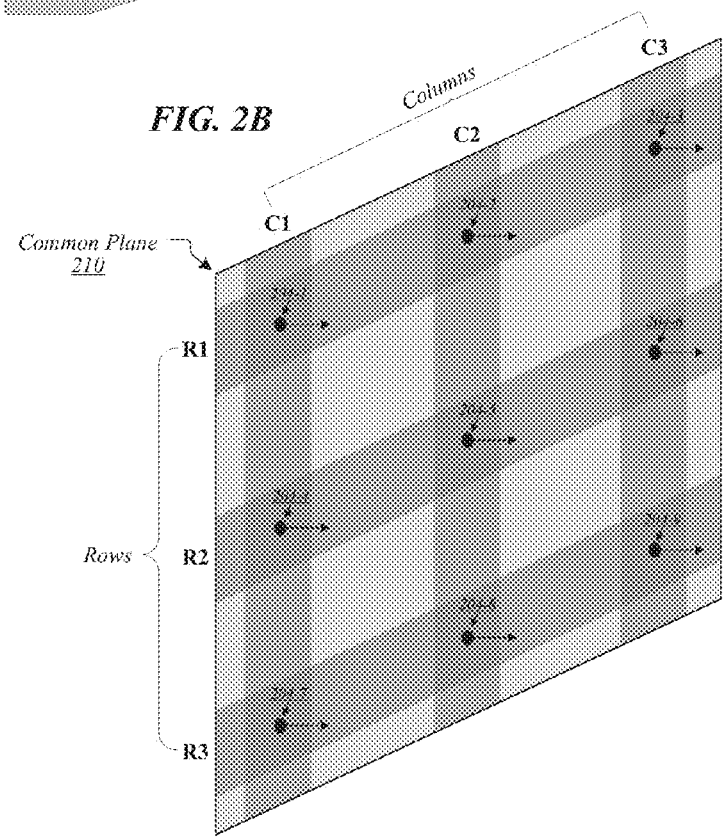
FIG. 2B illustrates a second embodiment of the first camera array.

FIG. 2B demonstrates that camera array 200 of FIG. 2A may comprise a 2D camera array. Included in FIG. 2B are the optical centers 204-n of the cameras 202-n in camera array 200 of FIG. 2A. As shown in FIG. 2B, these optical centers 204-n are situated in—or approximately in—a common plane 210, and reside—or approximately reside—in respective rows R1, R2, and R3 and columns C1, C2, and C3 within common plane 210. For example, optical centers 204-1, 204-4, and 204-7 all reside or approximately reside in column C1, and optical centers 204-7, 204-8, and 204-9 all reside or approximately reside in row R3. The embodiments are not limited to these examples. It is worthy of note that although nine cameras 202-n arranged in three rows and three columns are featured in the example 2D camera array of FIGS. 2A and 2B, 2D camera arrays comprising lesser or greater numbers of cameras and corresponding optical centers, rows, and columns are both possible and contemplated, and the embodiments are not limited in this context.

Returning to FIG. 1, in operation, a camera array 150 such as the 2D camera array 200 illustrated in FIGS. 2A and 2B may capture a plurality of captured images 152-p, which may be regarded as comprising a captured image array 152. A captured image array 152 comprising captured images 152-p captured by a 2D camera array 150 may comprise a two-dimensional captured image array. In some embodiments, captured image array 152 may comprise a number of captured images 152-p that is equal to the number of cameras 150-n in the camera array 150, and each of the captured images 152-p may comprise an image captured by a corresponding one of the cameras 150-n. The embodiments are not limited in this context.

Figure 3A:
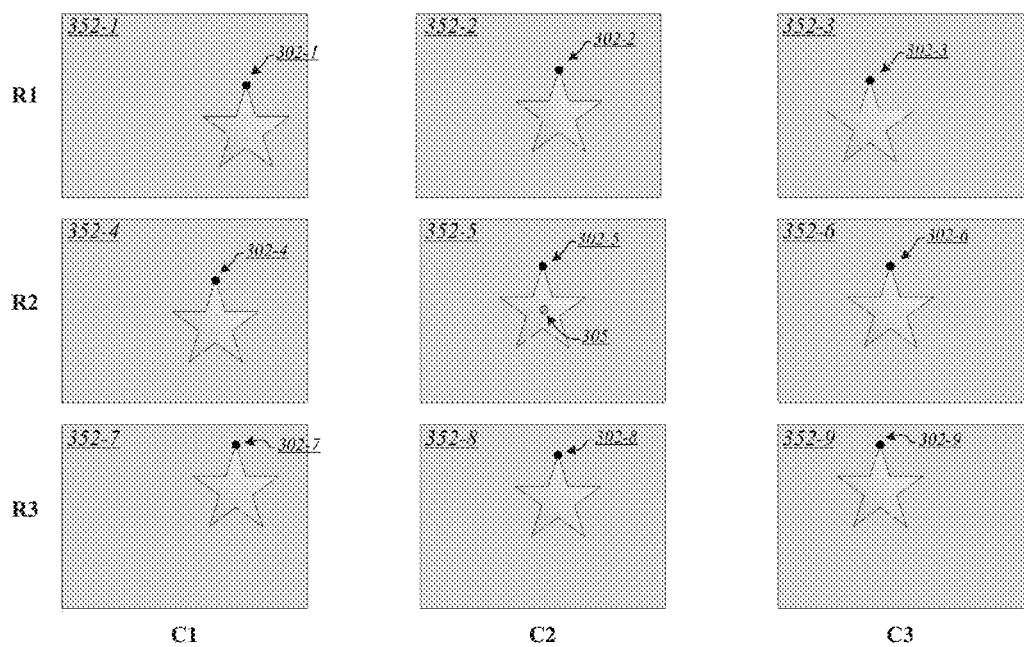
FIG. 3A illustrates one embodiment of a captured image array

FIG. 3A illustrates a captured image array 300 such as may comprise an example of a captured image array obtained by camera array 200 of FIG. 2A. As shown in FIG. 3A, captured image array 300 comprises nine captured images 352-p, which are arranged in three rows R1, R2, and R3, and three columns C1, C2, and C3, corresponding to the three rows and three columns into which the cameras 202-n of camera array 200 are arranged in FIG. 2A. Each captured image 352-p comprises a five-pointed star, the top point of which comprises a respective position 302-p. The embodiments are not limited to this example.

Returning to FIG. 1, in various embodiments, it may be desirable to combine information comprised within captured images such as captured images 352-p of FIG. 3A to generate a composite image 160 based on those captured images. For example, it may be desirable to generate a composite image 160 having enhanced, improved, and/or desired characteristics relative to those of any or all of the captured images 152-p in a captured image array 152, by combining information comprised within those captured images 152-p. In some embodiments, generating a composite image 160 based on the captured images 152-p may comprise determining corresponding positions of the various captured images 152-p, determining descriptive properties of those positions, and computing descriptive properties of positions in the composite image based on the descriptive properties of the corresponding positions in the captured images 152-p. With respect to any two particular images, a position within a first image and a position within a second image may be said to correspond to each other when the two positions comprise visual information describing the same—or approximately the same—point in three-dimensional space, such as a point on an object, feature, surface, person, landscape, or other physical entity or visual effect captured by a camera array 150. For example, with respect to captured images 352-p of FIG. 3A, positions 302-p may be said to correspond to each other, since each describes the top of the five-pointed star in its respective captured image 352-p. The embodiments are not limited to this example.

In various embodiments, determining corresponding positions in the captured images 152-p of a captured image array 152 may comprise searching within those captured images 152-p according to one or more matching algorithms. In some cases, searching for corresponding positions within a set of captured images 152-p may be computationally intensive, because for each position in a particular captured image 152-p, a search may be required over both a horizontal and vertical range of positions in the other captured images 152-p in order to locate corresponding positions. This may be the case when corresponding positions in the captured images 152-p are not aligned. For example, a search for corresponding positions 302-p within captured images 352-p of FIG. 3A may be computationally intensive, because those corresponding positions 302-p are neither horizontally or vertically aligned. More particularly, for example, positions 302-2, 302-5, and 302-8 reside at varying horizontal coordinates within their respective captured images 352-p, despite the fact that their respective captured images 352-p reside in the same column, C2, within captured image array 300. The embodiments are not limited to this example.

Returning to FIG. 1, in order to reduce the computational costs associated with searching for corresponding positions within a set of captured images 152-p, apparatus 100 and/or system 140, and/or one or more elements external to apparatus 100 and/or system 140 may be operative to perform image rectification on captured image array 152 to obtain a rectified image array 154 comprising rectified images 154-q. Rectified images 154-q may be generated such that corresponding positions of rectified images 154-q sharing a common row within a rectified image array 154 share a common horizontal coordinate within their respective rectified images 154-q, and corresponding positions of rectified images 154-q sharing a common column within the rectified image array 154 share a common vertical coordinate within their respective rectified images 154-q. In some embodiments, performing image rectification on a captured image array such as captured image array 152 to obtain a rectified image array such as rectified image array 154 may comprise identifying a common plane for the underlying camera array 150, defining a composite orientation for the camera array 150 based on the common plane, and rotationally transforming the captured images 152-p in the captured image array 152 based on the deviations of their capturing cameras' orientations from that of the camera array 150, the locations of their capturing cameras within the common plane, and/or the intrinsic parameters of their capturing cameras. In various embodiments, apparatus 100 and/or system 140, and/or one or more elements external to apparatus 100 and/or system 140, may be operative to generate a composite image 160 based on a captured image array 152 by generating a rectified image array 154 based on the captured image array 152 and then generating the composite image 160 based on the rectified image array 154. The embodiments are not limited in this context.

Figure 3B:
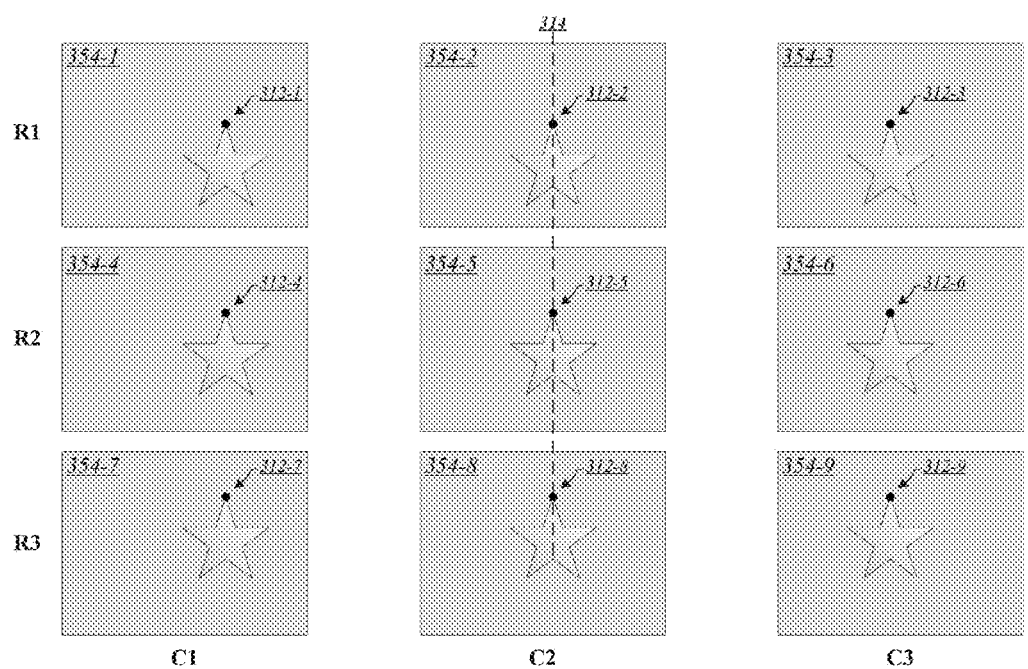
FIG. 3B illustrates one embodiment of a rectified image array.

FIG. 3B illustrates a rectified image array 310 such as may comprise an example of a rectified image array obtained by performing image rectification on captured image array 300 of FIG. 3A. As shown in FIG. 3B, rectified image array 310 comprises nine rectified images 354-q, corresponding to the nine captured images 352-p of captured image array 300 in FIG. 3A, and arranged into the same three rows R1, R2, and R3, and three columns C1, C2, and C3. However, unlike the corresponding positions 302-p in FIG. 3A, the corresponding positions 312-q in FIG. 3B are horizontally and vertically aligned with respect to the rows and columns of their associated images. For example, positions 312-2, 312-5, and 312-8 are comprised within rectified images 354-2, 354-5, and 354-8, respectively. Since rectified images 354-2, 354-5, and 354-8 all reside in column C2 of rectified image array 310, corresponding positions 312-2, 312-5, and 312-8 reside at the same horizontal coordinate within their respective captured images 352-p, as illustrated by dashed line 314. The embodiments are not limited to this example.

Returning to FIG. 1, as noted above, with respect to a captured image array 152, it may be desirable to generate a composite image 160 having enhanced, improved, and/or desired characteristics relative to those of any or all of the captured images 152-p in the captured image array 152 and/or the rectified images 154-q in the rectified image array 154. In some embodiments, for example, it may be desirable to generate a composite image 160 in which a particular focus region 161 is in focus. In various embodiments, such a focus region 161 may correspond to one or more positions of interest in one or more captured images 152-p and/or rectified images 154-q, which in turn may correspond to one or more objects, features, surfaces, persons, or other physical entities. An object, feature, surface, person, or other physical entity to which a position of interest corresponds may be referred to as a primary feature. In some such embodiments, a particular captured image 152-p or rectified image 154-q may comprise a reference image 155, a position of interest 157 may be selected within that reference image 155, and it may be desirable to generate a composite image 160 in which a focus region 161 containing a primary feature corresponding to that position of interest 157 in the reference image 155 is in focus. For instance, with respect to captured image array 300 of FIG. 3A, captured image 352-5 may comprise a reference image 155 and a position 305 may be selected as a position of interest 157. In the example of FIG. 3A, the position 305 lies at the center of the five-pointed star in captured image 352-5, and thus position 305 may be said to correspond to that five-pointed star. As such, the five-pointed star may comprise a primary feature, and it may be desirable to generate a composite image 160 in which a focus region 161 containing the five-pointed star is in focus. The embodiments are not limited to this example.

In various embodiments, in order to generate a composite image 160 in which a focus region 161 corresponding to a particular position of interest is in focus, imaging management module 106 may be operative to transform rectified image array 154 according to a focus depth corresponding to an associated depth of the position of interest with respect to the camera array 150. In some embodiments, the associated depth of the position of interest may comprise an approximate distance between the common plane of the camera array 150 and a point on an object, feature, surface, person, or other physical entity corresponding the particular position of interest. For example, the position of interest may comprise a point on an object, and the associated depth of the position of interest may comprise an approximate distance from the common plane of the camera array 150 to that object. In various such embodiments, transforming rectified image array 154 according to a focus depth may comprise determining, for one or more rectified images 154-q, one or more relative displacements 156-r corresponding to the focus depth and transforming the one or more rectified images 154-q according to the one or more relative displacements 156-q-r. In some embodiments, for a given focus depth, the one or more relative displacements 156-r may vary between the one or more rectified images 154-q. In various embodiments, for each of the one or more rectified images 154-q, the one or more relative displacements 156-q-r may comprise a horizontal displacement 156-q-1 and a vertical displacement 156-q-2. The embodiments are not limited in this context.

In some embodiments, the relative displacements 156-q-r for the various rectified images 154-q may vary according to the relative positions of the rectified images 154-q in rectified image array 154 with respect to a reference rectified image 154-q. In various embodiments, the relative displacements 156-q-r for the various rectified images 154-q may be determined according to the relative positions of the rectified images 154-q and according to one or more displacement factors 158-s. In some embodiments, the one or more displacement factors 158-s may be the same for each of the rectified images 154-q. Each displacement factor 158-s may characterize an estimated expected ratio between—for each rectified image 154-q—a relative displacement 156-q-r of a position in that rectified image 154-q and the distance between that rectified image 154-q and a reference rectified image 154-q. In various embodiments, the position in the rectified image 154-q may comprise a position corresponding to a reference position in the reference rectified image 154-q, and the relative displacement 156-q-r may comprise a displacement of the coordinates of the position in the rectified image 154-q with respect to the coordinates of the reference position in the reference rectified image 154-q. The embodiments are not limited in this context.

In some embodiments, the one or more displacement factors 158-s may comprise a horizontal displacement factor 158-1 and a vertical displacement factor 158-2. In various embodiments, the horizontal displacement factor 158-1 may characterize, for each of one or more rectified images 154-q, an estimated expected ratio between horizontal displacements 156-q-1 of positions in those rectified images 154-q and the horizontal distances between those rectified images 154-q and the reference rectified image 154-q, and the vertical displacement factor 158-2 may characterize, for each of the one or more rectified images 154-q, an estimated expected ratio between vertical displacements 156-q-2 of positions in those rectified images 154-q and the vertical distances between those rectified images 154-q and the reference rectified image 154-q. In some embodiments, for any particular rectified image 154-q, a horizontal displacement 156-q-1 may be determined by multiplying the horizontal displacement factor 158-1 by the horizontal distance between that rectified image 154-q and the reference rectified image 154-q, and a vertical displacement 156-q-2 may be determined by multiplying the vertical displacement factor 158-2 by the vertical distance between that rectified image 154-q and the reference rectified image 154-q. In various embodiments, the ratio between the horizontal displacement factor 158-1 and the vertical displacement factor 158-2 may vary in proportion to the ratio between the width and the height of the rectified image array 154. In some embodiments, the horizontal displacement factor 158-1 may be equal to the vertical displacement factor 158-2. In such embodiments, both the horizontal displacement factor 158-1 and the vertical displacement factor 158-2 may be said to be equal to a uniform displacement factor 158-3 that is applied in both the horizontal and vertical dimensions. The embodiments are not limited in this context.

FIG. 4 comprises an example embodiment of a camera array 400 in which a focus depth is illustrated. As shown in FIG. 4, camera array 400 comprises cameras 402-1, 402-2, 402-3, and 402-4. Each camera 402-n comprises a respective optical center 404-n and image plane 406-n. Although only these four cameras 402-n are illustrated in FIG. 4, a camera array such as camera array 400 may comprise additional cameras 402-n, and the embodiments are not limited in this context. A focus depth 409 comprises a distance between camera array 400, defined with respect to optical center 408-1 of camera 402-1, and a reference point 410. The lines connecting the reference point 410 to the optical centers 404-n of cameras 402-n intersect the image planes 406-n at respective positions 408-n. As such, positions 408-1, 408-2, 408-3, and 408-4 may be said to correspond to each other. In this example, camera 402-1 is selected as a reference camera, and position 408-1 in the image plane 406-1 of camera 402-1 is selected as a reference position. In the image plane 406-n of each other camera 402-n, a gap 412-n exists between the position 408-n and a position 414-n that resides at the same coordinates within the image plane 406-n as does reference position 408-1 within image plane 406-1. For example, in image plane 406-3, a gap 412-3 separates position 408-3—which corresponds to reference position 408-1 in image plane 406-1—from position 414-3, which resides at the same coordinates within image plane 406-3 as does reference position 408-1 within image plane 406-1.

As can be seen in FIG. 4, the sizes of the gaps 412-n are a function of the focus depth 409. For example, if focus depth 409 were increased, and thus reference point 410 was moved further away from camera array 400, the sizes of gaps 412-n would increase. As can also be seen in FIG. 4, the increases in the sizes of gaps 412-n will vary according to the distances between their corresponding cameras 402-n and the reference camera 402-1. For example, if focus depth 409 were increased, and thus reference point 410 was moved further away from camera array 400, gap 412-3 would increase by a greater amount than gap 412-2, because camera 402-3 is further away from reference camera 402-1 than is camera 402-2. The embodiments are not limited in this context.

Figure 5A:
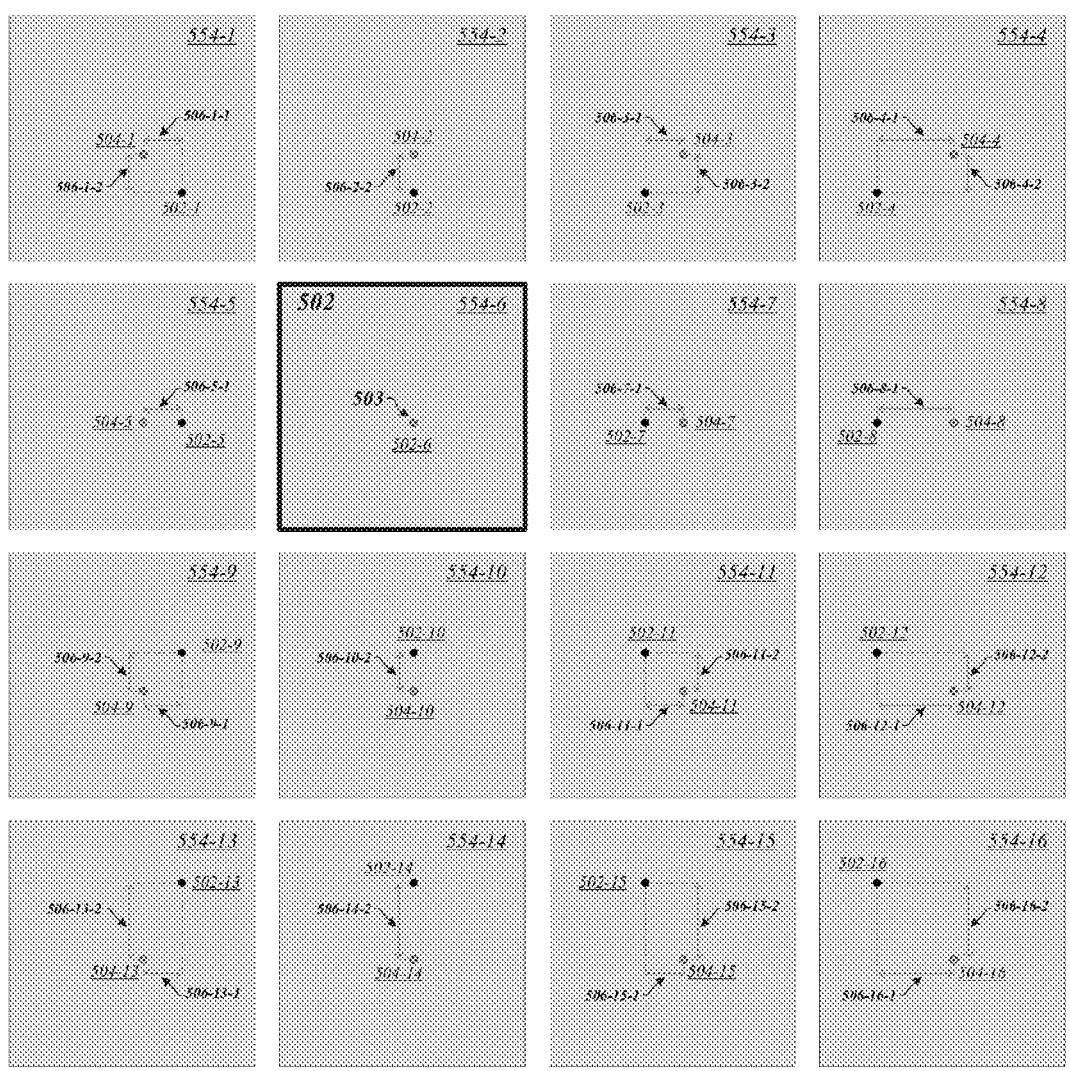
FIG. 5A illustrates a first embodiment of a rectified image array.

FIG. 5A comprises an embodiment of a rectified image array 500 in which relative displacements 506-q-r are illustrated in the rectified images 554-q. As shown in FIG. 5A, rectified image array 500 comprises sixteen rectified images 554-q, arranged into four rows and four columns. Each rectified image 554-q comprises a respective position 502-q that corresponds to the position 502-q in each other rectified image 554-q. Rectified image 554-6 is selected as reference image 502, and position 502-6 therein as a reference position 503. A position 504-q in each remaining rectified image 554-q illustrates the coordinates within that rectified image 554-q that correspond to the coordinates of reference position 503 within reference image 502. In each rectified image 554-q, the position 502-q is displaced from the position 504-q by a horizontal displacement 506-q-1 and/or a vertical displacement 506-q-2. For example, position 502-15 in rectified image 554-15 is displaced from position 504-15 by a horizontal displacement 506-15-1 and a vertical displacement 506-15-2. The embodiments are not limited to this example.

It is worthy of note that like the gaps 412-n of FIG. 4, the horizontal displacements 506-q-1 and the vertical displacements 506-q-2 in rectified images 554-q of FIG. 5 may vary according a focus depth of a corresponding camera array. In various embodiments, the horizontal displacements 506-q-1 and the vertical displacements 506-q-2 may comprise multiples of a horizontal displacement factor 158-1 and a vertical displacement factor 158-2. In some such embodiments, the horizontal displacement factor 158-1 and the vertical displacement factor 158-2 may vary in proportion to the focus depth, and the horizontal displacements 506-q-1 and the vertical displacements 506-q-2 may vary in proportion to the horizontal displacement factor 158-1 and the vertical displacement factor 158-2. In various embodiments, the horizontal displacement factor 158-1 and the vertical displacement factor 158-2 may both be equal to a uniform displacement factor 158-3 that is applied in both the horizontal and vertical dimensions. In some such embodiments, the horizontal displacements 506-q-1 and the vertical displacements 506-q-2 may comprise multiples of the uniform displacement factor 158-3, the uniform displacement factor 158-3 may vary in proportion to the focus depth, and the horizontal displacements 506-q-1 and the vertical displacements 506-q-2 may vary in proportion to the uniform displacement factor 158-3.

Figures 5B, 5C:
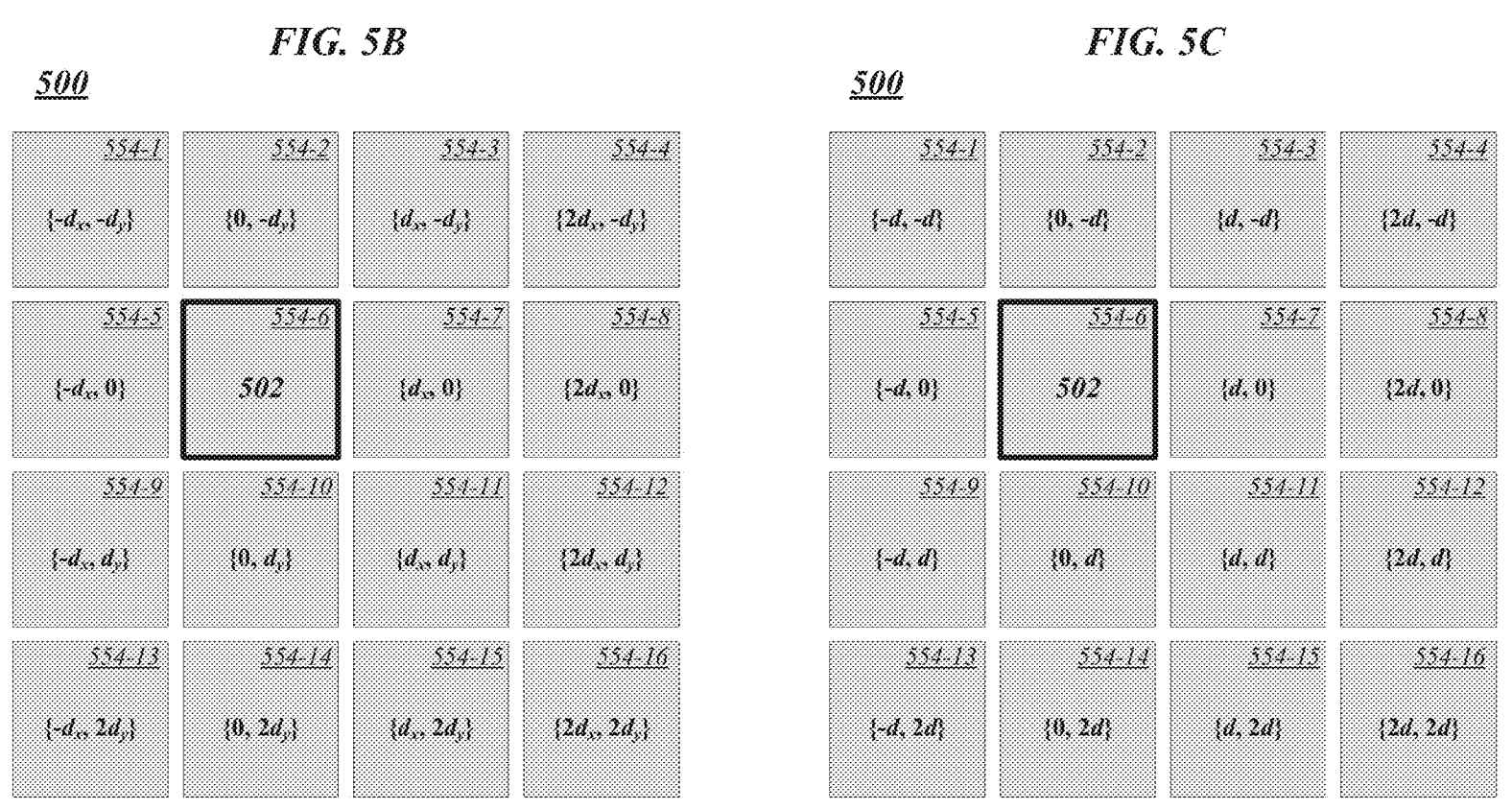

FIG. 5B illustrates the relationship between the positions of rectified images 554-q within rectified image array 500 of FIG. 5A and their horizontal and vertical displacements 506-q-1 and 506-q-2 according to various embodiments. Shown in FIG. 5B is an illustration of rectified image array 500, in which the horizontal and vertical displacements 506-q-1 and 506-q-2 for each rectified image 554-q are comprised in a parameter pair of the form {A, B}, where A represents the horizontal displacement 506-q-1 and B represents the vertical displacement 506-q-2. In the example of FIG. 5B, each horizontal displacement 506-q-1 comprises a multiple of a horizontal displacement factor $d_x$, and each vertical displacement 506-q-2 comprises a multiple of a vertical displacement factor $d_y$. More particularly, for each rectified image 554-q, the horizontal displacement 506-q-1 comprises the horizontal displacement factor $d_x$ multiplied by a horizontal distance in columns between the rectified image 554-q and the reference image 502, and the vertical displacement 506-q-2 comprises the vertical displacement factor $d_y$ multiplied by a vertical distance in rows between the rectified image 554-q and the reference image 502. For example, rectified image 554-16 is separated from reference image 502 by two rows in the positive horizontal direction and two columns in the positive vertical direction. Therefore, horizontal displacement 506-16-1 is $2d_x$, and vertical displacement 506-16-2 is $2d_y$. The embodiments are not limited to this example.

FIG. 5C illustrates a particular embodiment of rectified image array 500 as described in FIGS. 5A and 5B, in which the horizontal displacement factor $d_x$ and the vertical displacement factor $d_y$ are both equal to a uniform displacement factor d. In FIG. 5C, for each rectified image 554-q, the horizontal displacement 506-q-1 comprises the uniform displacement factor d multiplied by a horizontal distance in columns between the rectified image 554-q and the reference image 502, and the vertical displacement 506-q-2 comprises the uniform displacement factor d multiplied by a vertical distance in rows between the rectified image 554-q and the reference image 502. For example, rectified image 554-16 is separated from reference image 502 by two rows in the positive horizontal direction and two columns in the positive vertical direction. Therefore, horizontal displacement 506-16-1 is 2d, and vertical displacement 506-16-2 is 2d. The embodiments are not limited to this example.

Returning to FIG. 1, as noted above, in various embodiments, it may be desirable to generate a composite image 160 in which a focus region 161 containing a primary feature corresponding to a position of interest is in focus, and imaging management module 106 may be operative to transform rectified image array 154 according to a focus depth corresponding to an associated depth of that primary feature. However, in some embodiments, the associated depth of the primary feature may be unknown, and/or it may be undesirable to require that the associated depth of the primary feature be determined and/or input into apparatus 100 and/or system 140. For example, a user of a camera array 150 may wish to focus on a primary feature comprising an object, but may have no way of knowing or measuring the associated depth of that object with respect to the camera array 150.

In various embodiments, apparatus 100 and/or system 140 may be operative to generate a composite image 160 in which a focus region 161 containing a primary feature identified by a specified position of interest 157 in a reference image 155 is in focus without requiring that the associated depth of the primary feature be directly determined. More particularly, in some embodiments, instead of requiring a direct determination of the associated depth of the primary feature identified by a specified position of interest, imaging management module 106 may evaluate various candidate values of horizontal displacement factor 158-1, vertical displacement factor 158-2, and/or uniform displacement factor 158-3 based on a level of sharpness that they produce in the focus region 161 in the composite image 160 that contains the primary feature. Although these various candidate values may correspond to various associated depths, actual calculation of those associated depths may not be required.

In general operation, apparatus 100 and/or system 140 may be operative to receive a captured image array 152 captured by camera array 150-n, and/or may be operative to generate a rectified image array 154 based on such a captured image array 154, or to receive a rectified image array 154 generated by one or more external elements based on such a captured image array 152. In various embodiments, apparatus 100 and/or system 140 may be operative to send an instruction to camera array 150 to capture the images 152-p in the captured image array 152, and may receive the captured image array 152 in response to the instruction. The embodiments are not limited in this context.

In some embodiments, imaging management module 106 may be operative to identify and/or define a particular captured image 152-p within captured image array 152 and/or a particular rectified image 154-q within rectified image array 154 as a reference image 155. Although reference image 155 comprises a captured image 152-p in captured image array 152 in the example of FIG. 1, reference image 155 may comprise a rectified image 154-q in various embodiments. In some embodiments, a particular camera 150-n may be defined as a reference camera, such that each time a captured image array 152 and/or a rectified image array 154 is received, the captured image 152-p and/or rectified image 154-q corresponding to that camera 150-n will be defined as the reference image 155. In various other embodiments, the reference image 155 may comprise neither a captured image 152-p or a rectified image 154-q, but rather a distinct image generated by apparatus 100 and/or system 140, and/or one or more external elements. For example, in some embodiments, imaging management module 106 may be operative to generate a preliminary composite image 160 in which the region containing the primary feature is not necessarily in focus, and this preliminary composite image 160 may comprise the reference image 155. The embodiments are not limited in this context.

In various embodiments, apparatus 100 and/or system 140 may identify a position of interest 157 within the reference image 155. In some such embodiments, apparatus 100 and/or system 140 may receive a selection of the position of interest 157, and may identify the position of interest 157 based on the received selection. For example, in various embodiments, apparatus 100 and/or system 140 may present reference image 155 on display 142, and receive a selection of position of interest 157 within the reference image 155 via a user interface. In various such example embodiments, a user may use a mouse, joystick, touchpad, keyboard, or other input device to select the position of interest 157 in the reference image 155 via the user interface. In some embodiments, rather than receiving a user selection of position of interest 157, imaging management module 106 may be operative to identify position of interest 157 using one or more algorithms, subroutines, functions, or operations. For example, if captured image 352-5 of FIG. 3A comprises the reference image 155, imaging management module 106 may be operative to employ one or more algorithms to determine that the five-pointed star therein is a primary feature, and may identify position 305 as the position of interest 157 accordingly. The embodiments are not limited in this context.

In various embodiments, imaging management module 106 may be operative to determine a feature window 159 corresponding to the position of interest 157. In some embodiments, determining the feature window 159 may comprise determining a feature window boundary defining the feature window 159. The feature window boundary may define a region within the reference image 155 that contains a primary feature corresponding to the position of interest 157, and the feature window 159 may comprise that region within the reference image 155. In various embodiments, determining the feature window 159 may comprise determining a feature window position 159-1 and a feature window size 159-2. In some embodiments, the feature window position 159-1 may comprise a position at which the center of the feature window 159 resides within the reference image 155. In various embodiments, the feature window position 159-1 may be defined to be the same as the position of interest 157, while in other embodiments, the feature window position 159-1 may be determined based on properties of the primary feature corresponding to the position of interest 157, and may not be the same as the position of interest 157. The embodiments are not limited in this context.

In some embodiments, the feature window size 159-2 may comprise horizontal and vertical dimensions defining a height and width of feature window 159. In various embodiments, the height and/or width of feature window 159 may be defined in pixels. In some embodiments, feature window size 159-2 may comprise a size parameter 159-2-1 that specifies a single value as both the height and the width of the feature window 159. In various such embodiments, feature window 159 may comprise a square region in reference image 155. In some other embodiments, feature window size 159-2 may comprise a width parameter 159-2-2 that specifies the width of the feature window 159 and a height parameter 159-2-3 that specifies the height of the feature window 159, and the width of the feature window 159 may not be equal to the height of the feature window 159. The embodiments are not limited in this context.

In various embodiments, imaging management module 106 may be operative to determine feature window position 159-1 based on position of interest 157, and then to determine feature window size 159-2 based on feature window position 159-1. In some embodiments, imaging management module 106 may be operative to analyze reference image 155 to determine a feature window size 159-2 that contains a sufficient number of edge pixels but does not contain too large a proportion of pixels corresponding to depths significantly different from that of the primary feature. In various embodiments, imaging management module 106 may be operative to evaluate the squared norm of the spatial gradient of the intensity values of all the pixels of the reference image 155, to define a threshold based on the squared norm of the spatial gradient, and to compare the intensity values of pixels in the feature window 159 to the threshold to determine whether they are potential edge pixels. In some embodiments, the $90^{th}$ percentile of the squared norm of the spatial gradient may be employed as the threshold. However, other threshold values are both possible and contemplated, and the embodiments are not limited in this context.

In various embodiments, once imaging management module 106 has determined a number of potential edge pixels in a region of reference image 155 defined by a candidate feature window size 159-2, imaging management module 106 may be operative to evaluate that candidate feature window size 159-2 based on that number of potential edge pixels. In some such embodiments, imaging management module 106 may be operative to compare the number of potential edge pixels to an edge pixel minimum 170. Edge pixel minimum 170 may comprise a minimum number of potential edge pixels that must be identified within a region of reference image 155 corresponding to a candidate feature window size 159-2 in order for that candidate feature window size 159-2 to be considered acceptable. If the number of potential edge pixels is equal to or greater than the edge pixel minimum 170, imaging management module 106 may determine that the candidate feature window size 159-2 is acceptable. On the other hand, if the number of potential edge pixels is less than the edge pixel minimum 170, imaging management module 106 may determine that the candidate feature window size 159-2 is not acceptable. The embodiments are not limited in this context.

In various embodiments, a candidate feature window size 159-2 that contains an acceptable number of edge pixels may nevertheless be unsuitable for use in focusing on a position of interest, if it contains too large a proportion of pixels corresponding to depths significantly different from that of the primary feature, because the use of a feature window 159 containing too large a proportion of pixels corresponding to depths significantly different from that of the primary feature may cause blurring within the focus region 161 of composite image 160. As such, in some embodiments, the goal for imaging management module 106 may be to determine a feature window size 159-2 that is large enough to contain a sufficient number of edge pixels, but not so large that it defines a feature window in which too large a proportion of the pixels correspond to depths significantly different from those of the primary feature. To this end, in various embodiments, imaging management module 106 may be operative to determine feature window size 159-2 according to a first iterative process in which a smallest acceptable feature window size 159-2 is determined.

In some such embodiments, such a first iterative process may comprise selecting an initial candidate feature window size 159-2, determining a number of potential edge pixels within a region of reference image 155 corresponding to that candidate feature window size 159-2, and determining whether the candidate feature window size 159-2 is acceptable based on the number of potential edge pixels in the region to which it corresponds in reference image 155. In various embodiments, a minimum feature window size may be defined as the initial candidate feature window size. In some embodiments, the minimum feature window size may comprise a width and height of the feature window in pixels. In various embodiments, the minimum feature window width may differ from the minimum feature window height, while in other embodiments, the two may be equal. In an example embodiment, a minimum feature window size may comprise a minimum feature window width and height of 21 pixels. The embodiments are not limited to this example, however. In some embodiments, the first iterative process may further comprise determining the feature window size 159-2 as the initial candidate feature window size 159-2 if it is determined to be acceptable, and if it is not determined to be acceptable, iteratively incrementing and evaluating the candidate feature window size 159-2 until a smallest acceptable size is found and determining the feature window size 159-2 as that smallest acceptable size. The embodiments are not limited in this context.

Figure 6A:
FIG. 6A illustrates one embodiment of a reference image.

FIG. 6A illustrates an example embodiment of a reference image 600, such as may comprise an example of a reference image in which a feature window size may be determined for a position of interest. As shown in FIG. 6, a position of interest 602 approximately corresponds to a point on the right shoulder of a person 604. As such, the person 604 may comprise a primary feature corresponding to the position of interest 602. In various embodiments, imaging management module 106 of FIG. 1 may be operative to determine a feature window 159 based on a position of interest such as position of interest 602 in FIG. 6A. For example, with respect to reference image 600 of FIG. 6A, in some embodiments, imaging management module 106 may be operative to determine a feature window by selecting the position of interest 602 as the feature window location and performing an iterative feature window size determination process to determine a size for the feature window. The embodiments are not limited to this example.

FIG. 6B illustrates three example candidate feature windows such as might correspond to candidate feature window sizes evaluated by image management module 106 at the start of such an iterative feature window size determination process. Shown in FIG. 6B are three images 612-i, each comprising a same sub-region of the rectified image 600 of FIG. 6A, and in each of which a white dot represents the position of interest 602 of FIG. 6A. The images 612-i themselves are identical, but they contain differing example candidate feature windows. Shown in image 612-1 is a candidate feature window 606. Candidate feature window 606, which is the smallest of the three candidate feature windows illustrated in FIG. 6B, may comprise a square feature window corresponding to an initial candidate feature window size selected at the beginning of an iterative feature window size determination process, such as may be equal to a defined minimum feature window size for that iterative process. Candidate feature window 606 also may comprise an example of a candidate feature window that may not contain a sufficient number of potential edge pixels and that thus may be determined to be unacceptable, since all of the pixels within candidate feature window 606 appear to correspond to a same region of the shirt worn by person 604, which may exhibit a fairly uniform pixel intensity. The embodiments are not limited in this context.

Candidate feature window 608 in image 612-2 may comprise an example of a candidate feature window corresponding to a candidate feature window size that is greater than that reflected by candidate feature window 606 in image 612-1. In an example embodiment, an initial candidate feature window size defining candidate feature window 606 may be incremented in the course of an iterative feature window size determination process, and candidate feature window 608 may correspond to the incremented candidate feature window size. Candidate feature window 608 may also comprise an example of a candidate feature window that contains a sufficient number of potential edge pixels, since the contrast between the top of the right shoulder of person 604 and the staircase railing behind her—the boundary between which is partially comprised within candidate feature window 608—may cause a significant number of pixels along that boundary to be identified as potential edge pixels. Although a portion of the pixels in candidate feature window 608 correspond to the staircase railing in the background rather than to the primary feature, this portion is relatively small in relation to the overall size of candidate feature window 608. Therefore, the candidate feature window size defining candidate feature window 608 may be determined to be acceptable. The embodiments are not limited in this context.

Candidate feature window 610 in image 612-3 may comprise an example of a candidate feature window that contains a sufficient number of edge pixels, but that is nevertheless unacceptable because it contains too large a proportion of pixels that correspond to depths significantly different from those of the primary feature. Since the entire boundary between the top of the right shoulder of person 604 and the staircase railing behind her, as well as a significant portion of the boundary between the upper right arm of person 604 and that staircase railing, is contained within candidate feature window 610, and a significant number of pixels along those boundaries may be identified as edge pixels due to the contrast between the opposite sides of those boundaries, candidate feature window 610 may contain a sufficient number of edge pixels. However, a significantly larger portion of candidate feature window 610 comprises pixels corresponding to the staircase railing in the background in comparison to the portion of candidate feature window 608 that comprises such pixels. If the proportion of pixels in candidate feature window 610 that correspond to the staircase railing in the background is too high, blurring may result in a focus region 161 of a composite image 160 generated according to candidate feature window 610. Therefore, despite the fact that candidate feature window 610 may comprise a sufficient number of edge pixels, it may be determined to be unacceptable for use as a feature window 159. The embodiments are not limited in this context.

Returning to FIG. 1, in various embodiments, once the feature window 159 in reference image 155 has been determined, imaging management module 106 may be operative to determine one or more optimal displacement factors 158-s for a captured image array 152 or rectified image array 154 corresponding to the reference image 155, based on the feature window 159. In some embodiments, imaging management module 106 may be operative to determine the one or more optimal displacement factors 158-s according to a second iterative process. In each iteration of the second iterative process, one or more candidate displacement factors 158-s may be evaluated. In a first iteration of the second iterative process, the values of one or more candidate displacement factors 158-s may be determined according to one or more minimum displacement factors. For example, in a first iteration, a candidate displacement factor 158-s comprising a value of zero may be evaluated. In each subsequent iteration, the one or more candidate displacement factors 158-s may be incremented, and the incremented values may be evaluated. In various embodiments, the one or more candidate displacement factors 158-s may comprise integer numbers of pixels. In some embodiments, in each iteration, the one or more candidate displacement factors 158-s may be incremented by integer numbers of pixels. In various such embodiments, the one or more candidate displacement factors 158-s may be incremented by one pixel in each iteration. In the particular example of an initial iteration in which a candidate displacement factor 158-s comprising a value of zero is evaluated, in a second iteration, the candidate displacement factor 158-s may be incremented to a value of one, and the incremented candidate displacement factor 158-s comprising that value of one may be evaluated. In some other embodiments, sub-integer numbers of pixels may be used in conjunction with one or more pixel interpolation techniques. The embodiments are not limited in this context.

In various embodiments, the one or more optimal displacement factors 158-s may comprise displacement factors 158-s that, when applied to rectified image array 154, result in the generation of a composite image 160 comprising a focus region 161 exhibiting a maximized level of focus and/or sharpness. For a given set of candidate displacement factors 158-s, the one or more displacement factors 158-s corresponding to a focus region exhibiting a maximized level of focus and/or sharpness may comprise the one or more displacement factors among that set of candidate displacement factors 158-s that result in a maximum level of focus and/or sharpness with respect to all the candidate displacement factors 158-s in the set. In some embodiments, the evaluation of the one or more candidate displacement factors 158-s in each iteration of the second iterative process may comprise determining a level of focus and/or sharpness for a focus region 161 of a prospective composite image 160 generated according to those one or more candidate displacement factors 158-s. In various embodiments, performing this determination may not require actual generation of the entire prospective composite image 160, and instead may comprise generating only the portion of the prospective composite image 160 that resides within the focus region 161. In some embodiments, the focus region 161 for a prospective composite image 160 may be defined by a focus region boundary that defines what the location of the focus region 161 would be within the prospective composite image 160 if the prospective composite image 160 were actually generated. The process of generating the portion of a prospective composite image 160 that resides within its focus region 161 may be referred to as "generating the focus region 161," and this term shall be employed hereinafter. The embodiments are not limited in this context.

In various embodiments, the focus region 161 may be defined by a focus region boundary that corresponds to the feature window boundary defining feature window 159 in reference image 155. More particularly, in some embodiments, the focus region 161 may comprise the positions and/or pixels within composite image 160 that correspond to the positions and/or pixels within the feature window 159 in reference image 155. In various embodiments, the focus region boundary may be determined based on the feature window boundary. In embodiments in which reference image 155 comprises a captured image 152-p within captured image array 152 or a rectified image 154-q within rectified image array 154, a region within each other captured or rectified image that comprises the positions and/or pixels corresponding to those within the feature window 159 according to one or more displacement factors 158-s may be referred to as a projected feature window 163-t. In some such embodiments, for any one or more particular displacement factors 158-s, the focus region 161 in composite image 160 may be said to correspond to the projected feature windows 163-t defined within the various captured images 152-p and/or rectified images 154-q by those one or more particular displacement factors 158-s. As such, given one or more candidate displacement factors 158-s and a feature window 159 in reference image 155, a set of projected feature windows 163-t may be determined that corresponds to the focus region 161 in composite image 160 and to the feature window 159 in reference image 155. The embodiments are not limited in this context.

In various embodiments, generating the focus region 161 corresponding to one or more candidate displacement factors 158-s may comprise determining the projected feature windows 163-t defined by the one or more candidate displacement factors 158-s and averaging the pixel intensity values of the pixels within those projected feature windows 163-t and the feature window 159 in reference image 155. In some embodiments, once the focus region 161 corresponding to one or more candidate displacement factors 158-s has been generated, a level of focus may be determined for that focus region 161. In various embodiments, the level of focus may comprise a measure of sharpness. In some embodiments, such a measure of sharpness may be calculated as the squared norm of the spatial gradient of the focus region 161. In various embodiments, in each iteration of the second iterative process, the focus region 161 corresponding to the one or more candidate displacement factors 158-s to be evaluated may be generated, and a measurement of sharpness or other level of focus may be calculated for that focus region 161. In some embodiments, the second iterative process may continue until the one or more candidate displacement factors 158-s reach one or more displacement factor limits 180-v. In various embodiments, each of the one or more displacement factor limits 180-v may comprise a maximum candidate value for a corresponding one of the one or more candidate displacement factors 158-s. In some embodiments, the one or more candidate displacement factors 158-s that result in the generation of a focus region 161 exhibiting a maximized sharpness or other level of focus may be identified as the one or more optimal displacement factors 158-s. The embodiments are not limited in this context.

Figure 7A:
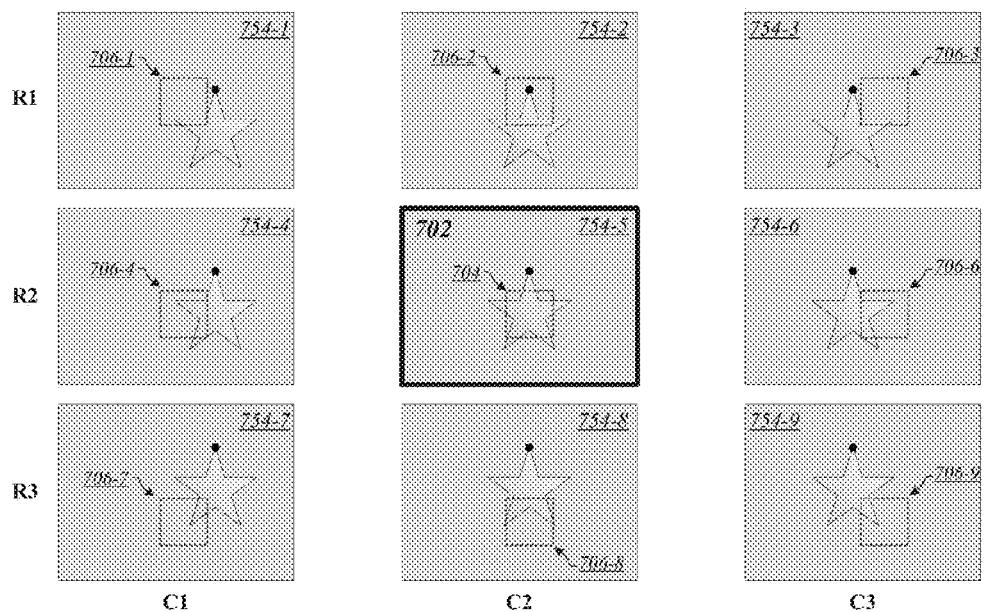
FIG. 7A illustrates one embodiment of a first set of projected feature windows.

FIG. 7A illustrates an example of a set of projected feature windows 706-q according to various embodiments. As shown in FIG. 7A, a rectified image array 700 comprises nine rectified images 754-q, which are arranged in three rows and three columns. Rectified image 754-5 is selected as a reference image 702, and comprises a feature window 704. Feature window 704 approximately contains the five-pointed star within reference image 702. Each other rectified image 754-q in rectified image array comprises a corresponding projected feature window 706-q. The set of projected feature windows 706-q may comprise an example of a set of feature windows that may be determined according to one or more displacement factors such as displacement factors 158-s of FIG. 1 in some embodiments. The set of projected feature windows 706-q may also comprise an example of a set of feature windows that do not result in a maximized level of focus or sharpness in a focus region 161 of a composite image 160. More particularly, this set of projected feature windows 706-q may correspond to one or more displacement factors that are too small, and that therefore result in horizontal and/or vertical translations of the feature window 704 that are too small. When the intensity values of the pixels within the various projected feature windows 706-q and the feature window 704 are averaged, the computed focus region 161 may be blurry, because the various projected feature windows 706-q comprise significantly differing portions of the five-pointed star, and thus the level of focus or sharpness for the computed focus region 161 may be low. The embodiments are not limited in this context.

Figure 7B:
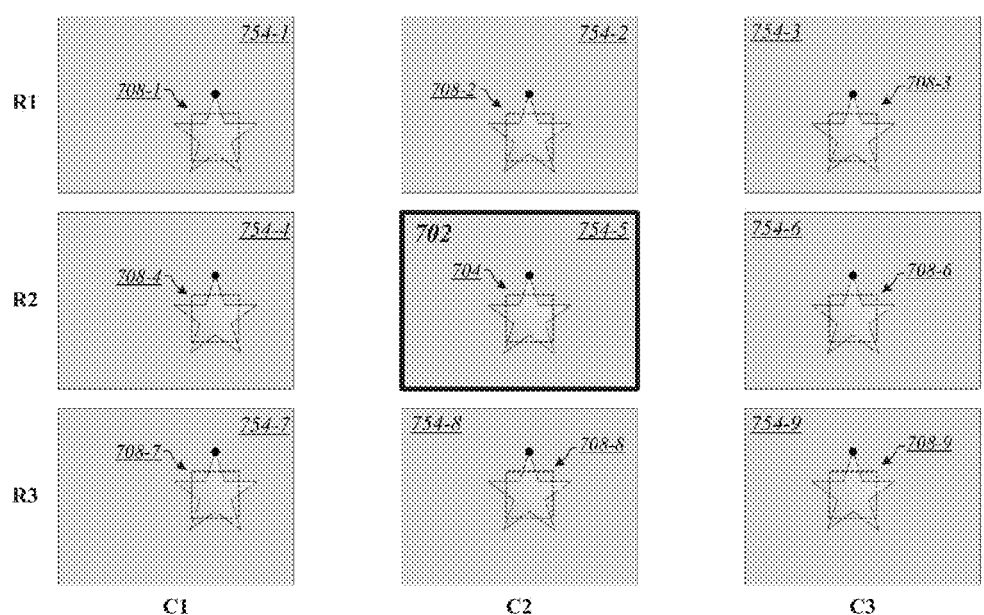
FIG. 7B illustrates one embodiment of a second set of projected feature windows.

FIG. 7B illustrates a set of projected feature windows 708-q which may comprise an example of a set of feature windows corresponding to one or more optimal displacement factors. As can be seen in FIG. 7B, the various projected feature windows 708-q comprise like portions of the five-pointed star, and thus when the intensity values of the pixels within the various projected feature windows 708-q and the feature window 704 are averaged, the computed focus region 161 may be in focus. As such, the level of focus or sharpness for the computed region 161 may be high. The embodiments are not limited in this context.

Returning to FIG. 1, in various embodiments, once the one or more optimal displacement factors 158-s have been determined, imaging management module 106 may be operative to transform captured image array 152 and/or rectified image array 154 according to the one or more optimal displacement factors 158-s. In some such embodiments, reference image 155 may comprise a rectified image 154-q within rectified image array 154, and imaging management module 106 may be operative to transform each other rectified image 154-q within rectified image array 154 according to the one or more optimal displacement factors 158-s. In various such embodiments, for each other rectified image 154-q in rectified image array 154, imaging management module 106 may be operative to determine one or more relative displacements 156-q-r based on the one or more optimal displacement factors 158-s and the relative positions of those rectified images 154-q in rectified image array 154 with respect to reference image 155. In some embodiments, for each other rectified image 154-q, the one or more relative displacements 156-q-r may comprise a horizontal displacement 156-q-1 and a vertical displacement 156-q-2. In various embodiments, imaging management module 106 may be operative to transform each other rectified image 154-q in the horizontal direction by horizontally transforming each of its pixels by the horizontal displacement 156-q-1, and may be operative to transform each other rectified image 154-q in the vertical direction by vertically transforming each of its pixels by the vertical displacement 156-q-2. The embodiments are not limited in this context.

In some embodiments, once captured image array 152 and/or rectified image array 154 has been transformed according to the one or more optimal displacement factors 158-s, imaging management module 106 may be operative to generate composite image 160 based on the transformed captured image array 152 and/or the transformed rectified image array 154. For example, in embodiments in which imaging management module 106 is operative to transform the rectified images 154-q within rectified image array 154 according to the one or more optimal displacement factors 158-s, imaging management module 106 may be operative to generate composite image 160 by averaging the pixel intensity values of the pixels in reference image 155 and the other rectified images 154-q in rectified image array. The embodiments are not limited in this context.

In various embodiments, the aforementioned techniques for generating a composite image 160 in which a focus region 161 is in focus may be applied to a series of captured image arrays 152 and/or rectified image arrays 154 to generate a video 162 comprising a series of frames comprising composite images 160, the focus region 161 in each one of which is in focus. For example, in some embodiments, camera array 150 may be used to capture a series of captured image arrays 152 comprising captured images 152-p of a scene in which an object in motion comprises the primary feature. Assuming that the camera array 150 is stationary, for each camera 150-n in camera array 150, the positions of the moving object in the captured images 152-p will vary from captured image array 152 to captured image array 152. Accordingly, the positions of the moving object in the rectified images 154-q generated based on the captured images 152-p will vary from rectified image array 154 to rectified image array 154. As such, if the feature corresponds to the moving object, the location of the feature window 159 may be expected to vary from reference image 155 to reference image 155 in the series of references images 155 corresponding to the series of captured image arrays 152 and/or the series of rectified image arrays 154.

In various embodiments, in order to account for the motion of the feature window 159 in the series of reference images 155, imaging management module 106 may be operative to utilize a motion tracking algorithm to track the motion of the feature window 159 from reference image 155 to reference image 155. Examples of algorithms that may be employed include an optical flow algorithm, a mean-shift based tracking algorithm, and an OpenTLD algorithm, although the embodiments are not limited to these examples. In some embodiments, when a captured image array 152 or a rectified image array 154 is received and/or generated, imaging management module 106 may utilize the motion tracking algorithm to identify the location of the feature window 159 in the reference image 155 corresponding to that captured image array 152 or rectified image array 154. In various such embodiments, imaging management module 106 may be operative to utilize the motion tracking algorithm to identify the location of the feature window 159 in the reference image 155 based on the location of the feature window in a preceding reference image 155, or on the locations of the feature windows in a plurality of preceding reference images 155. The embodiments are not limited in this context.

In some embodiments, when the position of a feature window 159 for a reference image 155 is determined using such a motion tracking algorithm, one or more displacement factors 158-s generated based on that reference image 155 may exhibit errors corresponding to the use of the motion tracking algorithm. In turn, frames comprising composite images 160 generated based on those one or more displacement factors 158-s may comprise visual artifacts caused by errors in those one or more displacement factors 158-s. In order to reduce or eliminate the occurrence of such artifacts, in various embodiments, the one or more displacement factors 158-s determined based on the series of reference images 155 may be smoothed. In some such embodiments, this smoothing may be accomplished by filtering the one or more displacement factors 158-s. In an example embodiment, the one or more displacement factors 158-s determined based on the series of reference images 155 may be smoothed using a Kalman filter. In various embodiments, a Kalman filter may also be applied to the motion tracking output to minimize visual artifacts in the refocused video. The embodiments are not limited in this context.

In some embodiments, each of one or more displacement factors 158-s to be determined based on a particular reference image 155 may be modeled according to a simple system model where the displacement is assumed to increase linearly with time, according to the equation:

$$d_t = d_{t-1} + v + \xi_{t-1}$$

where $d_t$ represents a particular displacement factor 158-s to be determined based on the particular reference image 155, $d_{t-1}$ represents the value determined for that displacement factor 158-s based on the preceding reference image 155, v denotes a state variable representing an expected change in the particular displacement factor 158-s per unit time, and $\xi_{t-1}$ represents system noise. In various embodiments, it may be assumed that estimation of each of the one or more displacement factors 158-s for any particular reference image 155 is affected by measurement noise, according to the equation:

$$z_t = d_t + \psi_t$$

where $\psi_t$ represents the measurement noise and $z_t$ represents the actually measured displacement factor. In some embodiments, estimates for the variances of the system noise $\xi_{t-1}$ and the measurement noise $\psi_t$ may be specified based on the confidence in the motion tracking algorithm and/or the autofocus calculations. In various embodiments, equal variances may be selected for the system noise $\xi_{t-1}$ and the measurement noise $\psi_t$. The embodiments are not limited in this context.

FIG. 8 illustrates one embodiment of a logic flow 800, which may be representative of the operations executed by one or more embodiments described herein. More particularly, logic flow 800 may comprise an example of a logic flow for generating a composite image according to various embodiments. As shown in logic flow 800, at 802, a captured image array may be received. For example, apparatus 100 and/or system 140 of FIG. 1 may receive captured image array 152. At 804, a rectified image array may be generated based on the captured image array. For example, apparatus 100 and/or system 140 of FIG. 1 may generate rectified image array 154 based on captured image array 152. At 806, a reference image may be defined within the rectified image array. For example, imaging management module 106 of FIG. 1 may define reference image 155 within rectified image array 154. At 808, a position of interest within the reference image may be determined. For example, imaging management module 106 of FIG. 1 may determine position of interest 157 within reference image 155.

At 810, a feature window may be determined based on the position of interest. For example, imaging management module 106 of FIG. 1 may determine feature window 159 based on position of interest 157. At 812, one or more displacement factors may be determined based on the feature window. For example, imaging management module 106 of FIG. 1 may determine one or more displacement factors 158-s based on feature window 159. At 814, the rectified image array may be transformed based on the one or more displacement factors. For example, imaging management module 106 of FIG. 1 may transform rectified image array 154 based on one or more displacement factors 158-s. At 816, a composite image may be generated based on the transformed rectified image array. For example, imaging management module 106 of FIG. 1 may generate composite image 160 based on a transformed version of rectified image array 154. The embodiments are not limited to these examples.

Figure 9:
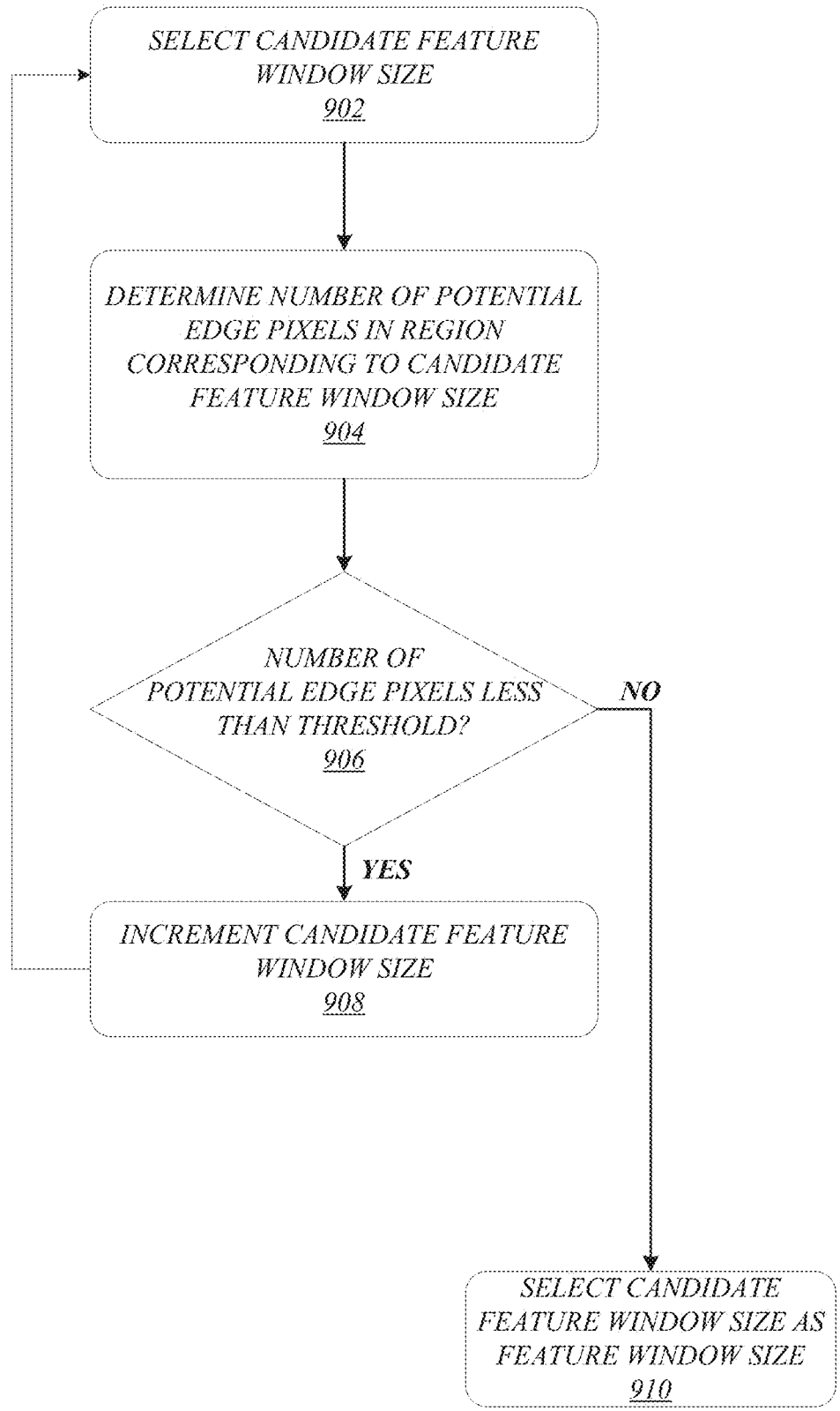
FIG. 9 illustrates one embodiment of a second logic flow.

FIG. 9 illustrates one embodiment of a logic flow 900, which may be representative of the operations executed by one or more embodiments described herein. More particularly, logic flow 900 may comprise an example of an iterative process for determining a feature window size. As shown in logic flow 900, at 902, a candidate feature window size may be selected. For example, imaging management module 106 of FIG. 1 may select a candidate feature window size. At 904, a number of potential edge pixels within a region corresponding to the candidate feature window size may be determined. For example, imaging management module 106 of FIG. 1 may determine a number of edge pixels within a region corresponding to the candidate feature window size. At 906, the number of potential edge pixels may be compared to the threshold. For example, imaging management module 106 of FIG. 1 may compare the number of potential edge pixels to edge pixel minimum 170. If, at 906, it is determined that the number of potential edge pixels is less than the threshold, flow may pass to 908. At 908, the candidate feature window size may be incremented. For example, imaging management module 106 of FIG. 1 may increment the candidate feature window size. From 908, flow may then pass back to 904. On the other hand, if, at 906, it is determined that the number of potential edge pixels is greater than or equal to the threshold, flow may pass to 910, where the candidate feature window size may be selected as the feature window size. For example, imaging management module 106 of FIG. 1 may select the candidate feature window size as the feature window size. The embodiments are not limited to these examples.

Figure 10:
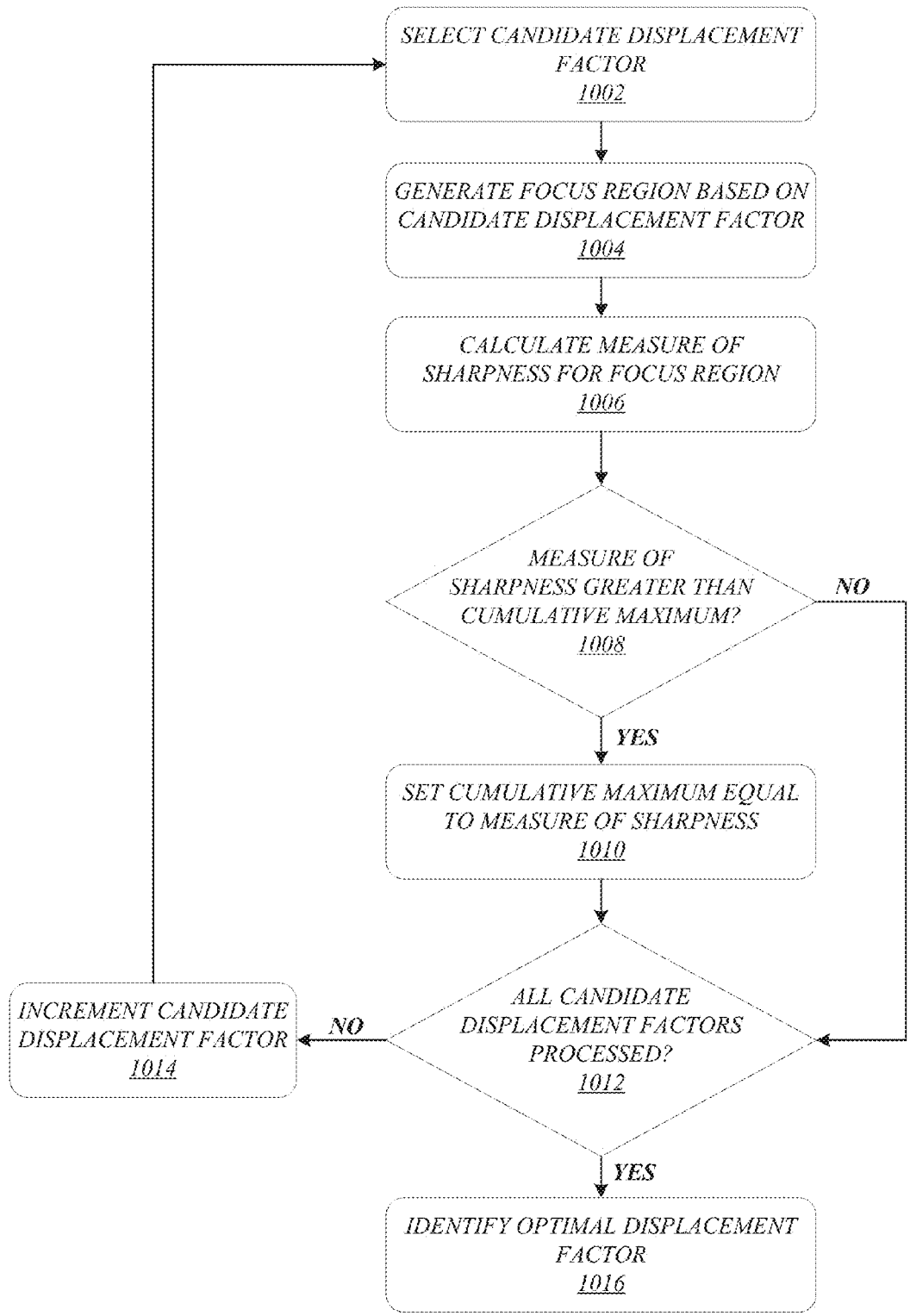
FIG. 10 illustrates one embodiment of a third logic flow.

FIG. 10 illustrates one embodiment of a logic flow 1000, which may be representative of the operations executed by one or more embodiments described herein. More particularly, logic flow 1000 may comprise an example of an iterative process for determining an optimal displacement factor for a rectified image array. As shown in logic flow 1000, at 1002, a candidate displacement factor may be selected. For example, imaging management module 106 of FIG. 1 may select a candidate displacement factor. At 1004, a focus region may be generated based on the candidate displacement factor. For example, imaging management module 106 of FIG. 1 may generate a focus region 161 for a prospective composite image 160 based on the candidate displacement factor. At 1006, a measure of sharpness may be calculated for the focus region. For example, imaging management module 106 of FIG. 1 may calculate a measure of sharpness for a focus region 161. At 1008, the measure of sharpness may be compared to a cumulative maximum. For example, imaging management module 106 of FIG. 1 may compare the measure of sharpness to a cumulative maximum. If it is determined at 1008 that the measure of sharpness is greater than the cumulative maximum, flow may pass to 1010. At 1010, the cumulative maximum may be set equal to the measure of sharpness. For example, imaging management module 106 of FIG. 1 may set the cumulative maximum equal to the measure of sharpness. From 1010, flow may pass to 1012. If it is determined at 1008 that the measure of sharpness is not greater than the cumulative maximum, flow may pass directly to 1012.

At 1012, it may be determined whether all candidate displacement factors have been processed. For example, imaging management module 106 of FIG. 1 may determine whether all candidate displacement factors have been processed, based on whether one or more displacement factor limits 180-v have been reached. If it is determined at 1012 that all candidate displacement factors have not been processed, flow may pass to 1014. At 1014, the candidate displacement factor may be incremented. For example, imaging management module 106 of FIG. 1 may increment the candidate displacement factor. From 1014, flow may pass back to 1004. If, at 1012, it is determined that all candidate displacement factors have been processed, flow may pass to 1016. At 1016, the candidate displacement factor that yielded the maximum measure of sharpness in the focus region, and that thus corresponds to a maximized measure of sharpness, may be identified as the optimal displacement factor for the rectified image array. For example, imaging management module 106 of FIG. 1 may identify the candidate displacement factor that maximized a measure of sharpness in focus region 161 as an optimal displacement factor 158-s. The embodiments are not limited to these examples.

Figure 11:
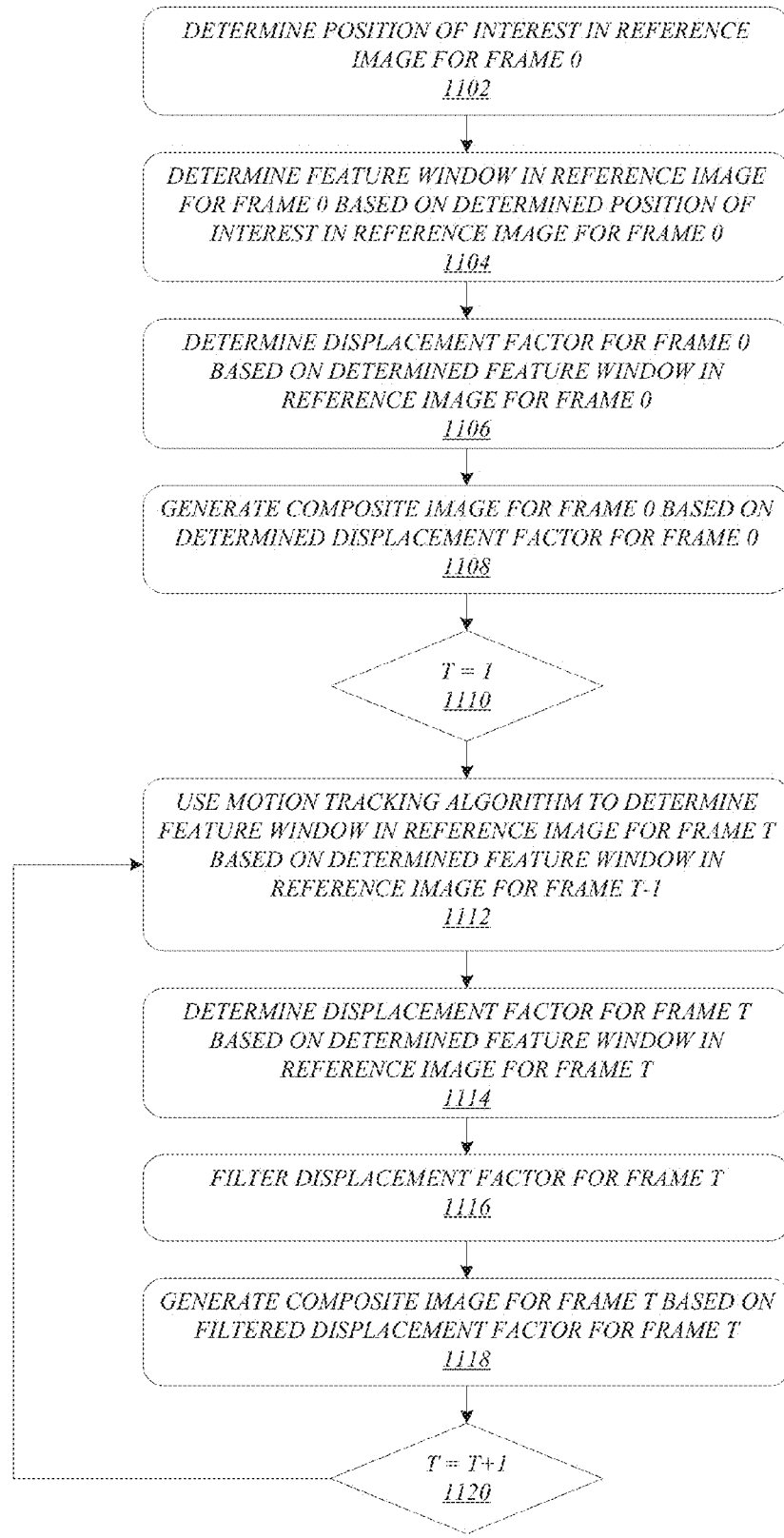
FIG. 11 illustrates one embodiment of a fourth logic flow.

FIG. 11 illustrates one embodiment of a logic flow 1100, which may be representative of the operations executed by one or more embodiments described herein. More particularly, logic flow 1100 may comprise an example of a process for tracking and focusing on a feature in a video comprising frames generated based on a series of captured image arrays and/or rectified image arrays. As shown in logic flow 1100, at 1102, a position of interest may be determined in a reference image for a frame 0. For example, imaging management module 106 of FIG. 1 may be operative to determine a position of interest 157 in a reference image 155 of a rectified image array 154 corresponding to a frame 0. At 1104, a feature window may be determined in the reference image for the frame 0 based on the determined position of interest in the reference image for the frame 0. For example, imaging management module 106 of FIG. 1 may be operative to determine a feature window 159 in the reference image 155 of the rectified image array 154 corresponding to the frame 0, based on the determined position of interest 157 in the reference image 155 of the rectified image array 154 corresponding to the frame 0.

At 1106, a displacement factor for the frame 0 may be determined based on the determined feature window in the reference image for the frame 0. For example, imaging management module 106 of FIG. 1 may be operative to determine a displacement factor 158-s for the frame 0 based on the determined feature window 159 in the reference image 155 of the rectified image array 154 corresponding to the frame 0. At 1108, a composite image may be generated for the frame 0 based on the determined displacement factor for the frame 0. For example, imaging management module 106 of FIG. 1 may be operative to generate a composite image 160 for the frame 0 based on the displacement factor 158-s for the frame 0. At 1110, a variable T comprising a frame number variable may be initialized with a value of 1. For example, imaging management module 106 of FIG. 1 may be operative to initialize a variable T with a value of 1. At 1112, a motion tracking algorithm may be used to determine a feature window in a reference image for a frame T based on the determined feature window in a reference image for frame T−1. For example, imaging management module 106 of FIG. 1 may be operative to use a motion tracking algorithm to determine a feature window 159 in a reference image 155 of a rectified image array 154 corresponding to a frame T based on a determined feature window 159 in a reference image 155 of a rectified image array 154 corresponding to a frame T−1.

At 1114, a displacement factor for the frame T may be determined based on the determined feature window in the reference image for the frame T. For example, imaging management module 106 of FIG. 1 may be operative to determine a displacement factor 158-s for the frame T based on the determined feature window 159 in the reference image 155 of the rectified image array 154 corresponding to the frame T. At 1116, the displacement factor for the frame T may be filtered to obtain a filtered displacement factor for the frame T. For example, imaging management module 106 of FIG. 1 may be operative to filter the displacement factor 158-s for the frame T using a Kalman filter to obtain a filtered displacement factor 158-s for the frame T. At 1118, a composite image for the frame T may be generated based on the filtered displacement factor for the frame T. For example, imaging management module 106 of FIG. 1 may be operative to generate a composite image 160 for the frame T based on the filtered displacement factor 158-s for the frame T. At 1120, the value of T may be incremented, and flow may return to 1112. For example, imaging management module 106 of FIG. 1 may increment the value of T. The embodiments are not limited to these examples.

Figure 12:
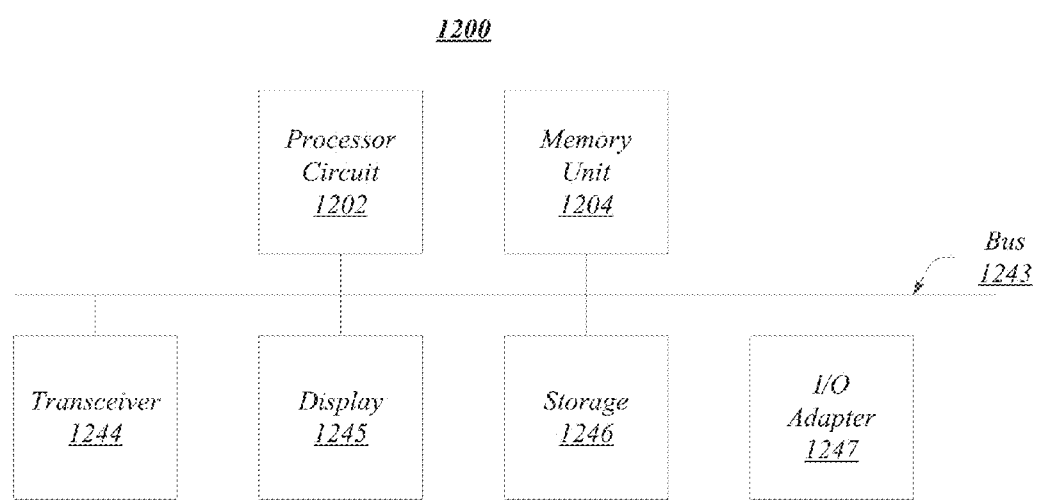
FIG. 12 illustrates one embodiment of a second system.

FIG. 12 illustrates one embodiment of a system 1200. In various embodiments, system 1200 may be representative of a system or architecture suitable for use with one or more embodiments described herein, such as apparatus 100 and/or system 140 of FIG. 1, logic flow 800 of FIG. 8, logic flow 900 of FIG. 9, logic flow 1000 of FIG. 10, and/or logic flow 1100 of FIG. 11. The embodiments are not limited in this respect.

As shown in FIG. 12, system 1200 may include multiple elements. One or more elements may be implemented using one or more circuits, components, registers, processors, software subroutines, modules, or any combination thereof, as desired for a given set of design or performance constraints. Although FIG. 12 shows a limited number of elements in a certain topology by way of example, it can be appreciated that more or less elements in any suitable topology may be used in system 1200 as desired for a given implementation. The embodiments are not limited in this context.

In various embodiments, system 1200 may include a processor circuit 1202. Processor circuit 1202 may be implemented using any processor or logic device, and may be the same as or similar to processor circuit 102 of FIG. 1.

In one embodiment, system 1200 may include a memory unit 1204 to couple to processor circuit 1202. Memory unit 1204 may be coupled to processor circuit 1202 via communications bus 1243, or by a dedicated communications bus between processor circuit 1202 and memory unit 1204, as desired for a given implementation. Memory unit 1204 may be implemented using any machine-readable or computer-readable media capable of storing data, including both volatile and non-volatile memory, and may be the same as or similar to memory unit 104 of FIG. 1. In some embodiments, the machine-readable or computer-readable medium may include a non-transitory medium. The embodiments are not limited in this context.

In various embodiments, system 1200 may include a transceiver 1244. Transceiver 1244 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 1244 may operate in accordance with one or more applicable standards in any version. The embodiments are not limited in this context.

In various embodiments, system 1200 may include a display 1245. Display 1245 may constitute any display device capable of displaying information received from processor circuit 1202, and may be the same as or similar to display 142 of FIG. 1.

In various embodiments, system 1200 may include storage 1246. Storage 1246 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 1246 may include technology to increase the storage performance enhanced protection for valuable digital media when multiple hard drives are included, for example. Further examples of storage 1246 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 1200 may include one or more I/O adapters 1247. Examples of I/O adapters 1247 may include Universal Serial Bus (USB) ports/adapters, IEEE 1394 Firewire ports/adapters, and so forth. The embodiments are not limited in this context.

Figure 13:
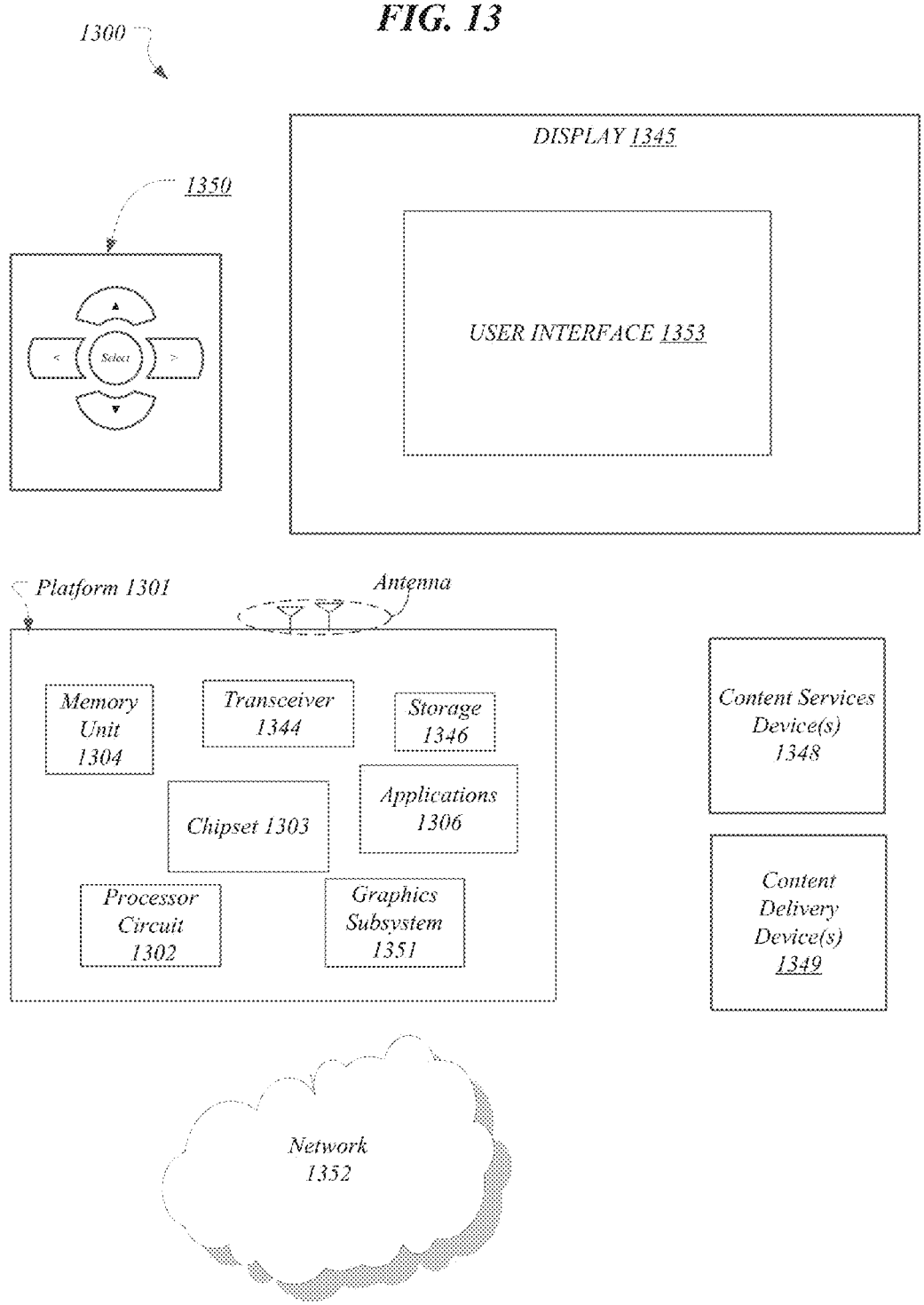
FIG. 13 illustrates one embodiment of a third system.

FIG. 13 illustrates an embodiment of a system 1300. In various embodiments, system 1300 may be representative of a system or architecture suitable for use with one or more embodiments described herein, such as apparatus 100 and/or system 140 of FIG. 1, logic flow 800 of FIG. 8, logic flow 900 of FIG. 9, logic flow 1000 of FIG. 10, logic flow 1100 of FIG. 11, and/or system 1200 of FIG. 12. The embodiments are not limited in this respect.

As shown in FIG. 13, system 1300 may include multiple elements. One or more elements may be implemented using one or more circuits, components, registers, processors, software subroutines, modules, or any combination thereof, as desired for a given set of design or performance constraints. Although FIG. 13 shows a limited number of elements in a certain topology by way of example, it can be appreciated that more or less elements in any suitable topology may be used in system 1300 as desired for a given implementation. The embodiments are not limited in this context.

In embodiments, system 1300 may be a media system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 1300 includes a platform 1301 coupled to a display 1345. Platform 1301 may receive content from a content device such as content services device(s) 1348 or content delivery device(s) 1349 or other similar content sources. A navigation controller 1350 including one or more navigation features may be used to interact with, for example, platform 1301 and/or display 1345. Each of these components is described in more detail below.

In embodiments, platform 1301 may include any combination of a processor circuit 1302, chipset 1303, memory unit 1304, transceiver 1344, storage 1346, applications 1306, and/or graphics subsystem 1351. Chipset 1303 may provide intercommunication among processor circuit 1302, memory unit 1304, transceiver 1344, storage 1346, applications 1306, and/or graphics subsystem 1351. For example, chipset 1303 may include a storage adapter (not depicted) capable of providing intercommunication with storage 1346.

Processor circuit 1302 may be implemented using any processor or logic device, and may be the same as or similar to processor circuit 1202 in FIG. 12.

Memory unit 1304 may be implemented using any machine-readable or computer-readable media capable of storing data, and may be the same as or similar to memory unit 1204 in FIG. 12.

Transceiver 1344 may include one or more radios capable of transmitting and receiving signals using various suitable wireless communications techniques, and may be the same as or similar to transceiver 1244 in FIG. 12.

Display 1345 may include any television type monitor or display, and may be the same as or similar to display 1245 in FIG. 12.

Storage 1346 may be implemented as a non-volatile storage device, and may be the same as or similar to storage 1246 in FIG. 12.

Graphics subsystem 1351 may perform processing of images such as still or video for display. Graphics subsystem 1351 may be a graphics processing unit (GPU) or a visual processing unit (VPU), for example. An analog or digital interface may be used to communicatively couple graphics subsystem 1351 and display 1345. For example, the interface may be any of a High-Definition Multimedia Interface, DisplayPort, wireless HDMI, and/or wireless HD compliant techniques. Graphics subsystem 1351 could be integrated into processor circuit 1302 or chipset 1303. Graphics subsystem 1351 could be a stand-alone card communicatively coupled to chipset 1303.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 1348 may be hosted by any national, international and/or independent service and thus accessible to platform 1301 via the Internet, for example. Content services device(s) 1348 may be coupled to platform 1301 and/or to display 1345. Platform 1301 and/or content services device(s) 1348 may be coupled to a network 1352 to communicate (e.g., send and/or receive) media information to and from network 1352. Content delivery device(s) 1349 also may be coupled to platform 1301 and/or to display 1345.

In embodiments, content services device(s) 1348 may include a cable television box, personal computer, network, telephone, Internet enabled devices or appliance capable of delivering digital information and/or content, and any other similar device capable of unidirectionally or bidirectionally communicating content between content providers and platform 1301 and/display 1345, via network 1352 or directly. It will be appreciated that the content may be communicated unidirectionally and/or bidirectionally to and from any one of the components in system 1300 and a content provider via network 1352. Examples of content may include any media information including, for example, video, music, medical and gaming information, and so forth.

Content services device(s) 1348 receives content such as cable television programming including media information, digital information, and/or other content. Examples of content providers may include any cable or satellite television or radio or Internet content providers. The provided examples are not meant to limit embodiments of the invention.

In embodiments, platform 1301 may receive control signals from navigation controller 1350 having one or more navigation features. The navigation features of navigation controller 1350 may be used to interact with a user interface 1353, for example. In embodiments, navigation controller 1350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be echoed on a display (e.g., display 1345) by movements of a pointer, cursor, focus ring, or other visual indicators displayed on the display. For example, under the control of software applications 1306, the navigation features located on navigation controller 1350 may be mapped to virtual navigation features displayed on user interface 1353. In embodiments, navigation controller 1350 may not be a separate component but integrated into platform 1301 and/or display 1345. Embodiments, however, are not limited to the elements or in the context shown or described herein.

In embodiments, drivers (not shown) may include technology to enable users to instantly turn on and off platform 1301 like a television with the touch of a button after initial boot-up, when enabled, for example. Program logic may allow platform 1301 to stream content to media adaptors or other content services device(s) 1348 or content delivery device(s) 1349 when the platform is turned "off." In addition, chip set 1303 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 1300 may be integrated. For example, platform 1301 and content services device(s) 1348 may be integrated, or platform 1301 and content delivery device(s) 1349 may be integrated, or platform 1301, content services device(s) 1348, and content delivery device(s) 1349 may be integrated, for example. In various embodiments, platform 1301 and display 1345 may be an integrated unit. Display 1345 and content service device(s) 1348 may be integrated, or display 1345 and content delivery device(s) 1349 may be integrated, for example. These examples are not meant to limit the invention.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 1301 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
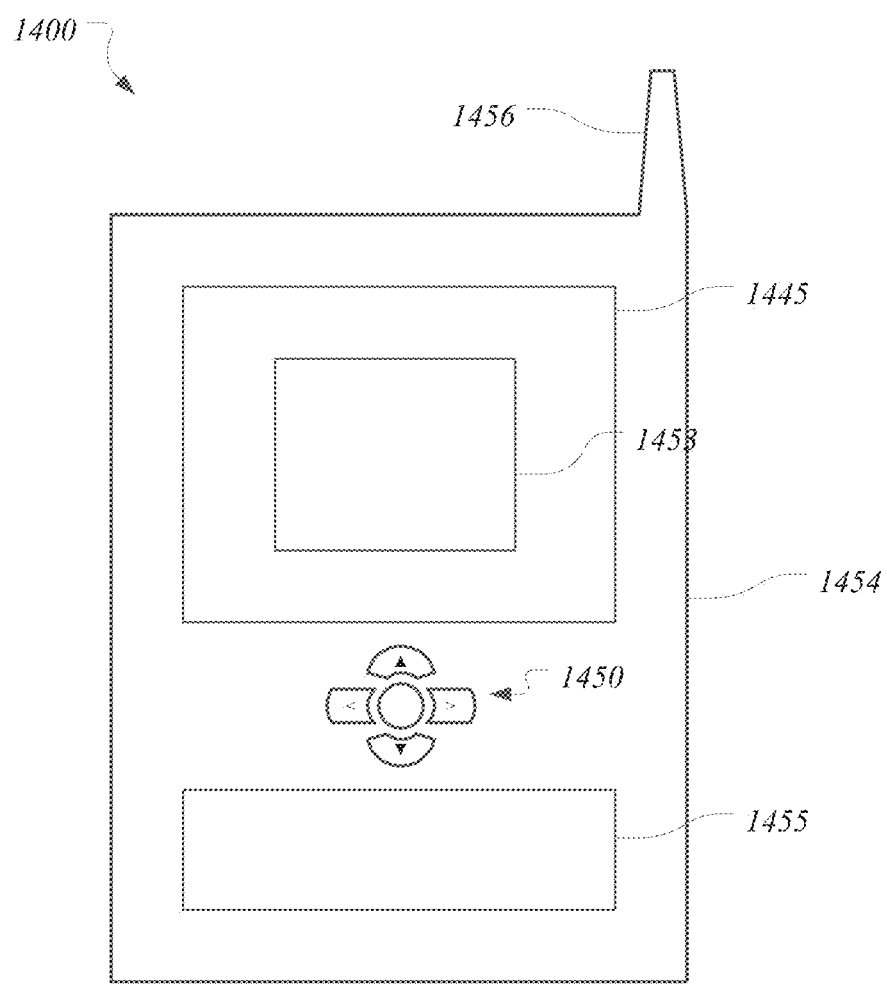
FIG. 14 illustrates one embodiment of a device.

As described above, system 1300 may be embodied in varying physical styles or form factors. FIG. 14 illustrates embodiments of a small form factor device 1400 in which system 1300 may be embodied. In embodiments, for example, device 1400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a display 1445, a navigation controller 1450, a user interface 1453, a housing 1454, an I/O device 1455, and an antenna 1456. Display 1445 may include any suitable display unit for displaying information appropriate for a mobile computing device, and may be the same as or similar to display 1345 in FIG. 13. Navigation controller 1450 may include one or more navigation features which may be used to interact with user interface 1453, and may be the same as or similar to navigation controller 1350 in FIG. 13. I/O device 1455 may include any suitable I/O device for entering information into a mobile computing device. Examples for I/O device 1455 may include an alphanumeric keyboard, a numeric keypad, a touch pad, input keys, buttons, switches, rocker switches, microphones, speakers, voice recognition device and software, and so forth. Information also may be entered into device 1400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

At least one machine-readable medium may comprise a plurality of instructions that, in response to being executed on a computing device, cause the computing device to determine a corresponding sharpness for each of a plurality of candidate displacement factors for an image array comprising a plurality of images, determine an optimal displacement factor comprising a candidate displacement factor corresponding to a maximized sharpness of a focus region for a composite image, and transform the image array based on the optimal displacement factor to align regions of the plurality of images that correspond to the focus region.

Such at least one machine-readable medium may comprise instructions that, in response to being executed on the computing device, cause the computing device to determine a position of interest in a reference image comprising one of the plurality of images in the image array, determine a feature window in the reference image based on the position of interest, and determine the corresponding sharpness for each of the plurality of candidate displacement factors based on the feature window.

With respect to such at least one machine-readable medium, determining the feature window may comprise determining a feature window size by determining a smallest candidate feature window size for which a corresponding feature window contains a sufficient number of potential edge pixels.

Such at least one machine-readable medium may comprise instructions that, in response to being executed on the computing device, cause the computing device to determine a boundary of the focus region for the composite image based on a boundary of the feature window in the reference image.

With respect to such at least one machine-readable medium, determining the corresponding sharpness for a candidate displacement factor may comprise determining a projected feature window based on the candidate displacement factor and the boundary of the feature window in the reference image for each image in the image array other than the reference image, generating the focus region for the composite image based on the feature window and the projected feature windows, determining a sharpness of the generated focus region, and determining the corresponding sharpness for the candidate displacement factor based on the sharpness of the generated focus region.

With respect to such at least one machine-readable medium, generating the focus region for the composite image may comprise averaging pixel intensities of pixels in the feature window and the projected feature windows.

Such at least one machine-readable medium may comprise instructions that, in response to being executed on the computing device, cause the computing device to generate the composite image based on the transformed image array.

With respect to such at least one machine-readable medium, transforming the image array based on the optimal displacement factor may comprise determining one or more corresponding relative displacements based on the optimal displacement factor and a relative position of that image within the image array for each image in the image array and translating each image in the image array based on its one or more corresponding relative displacements.

Such at least one machine-readable medium may comprise instructions that, in response to being executed on the computing device, cause the computing device to determine a feature window in a reference image of a second image array based on the feature window in the reference image comprising one of the plurality of images in the image array using a motion tracking algorithm, determine a displacement factor for the second image array based on the feature window in the reference image of the second image array, filter the displacement factor for the second image array, and transform the second image array based on the filtered displacement factor for the second image array.

An apparatus may comprise a processor circuit and an imaging management module for execution on the processor circuit to determine a corresponding sharpness for each of a plurality of candidate displacement factors for an image array comprising a plurality of images, determine an optimal displacement factor comprising a candidate displacement factor corresponding to a maximized sharpness of a focus region for a composite image, and transform the image array based on the optimal displacement factor to align regions of the plurality of images that correspond to the focus region.

With respect to such an apparatus, the imaging management module may determine a position of interest in a reference image comprising one of the plurality of images in the image array, determine a feature window in the reference image based on the position of interest, and determine the corresponding sharpness for each of the plurality of candidate displacement factors based on the feature window.

With respect to such an apparatus, the imaging management module may determine a feature window size by determining a smallest candidate feature window size for which a corresponding feature window contains a sufficient number of potential edge pixels.

With respect to such an apparatus, the imaging management module may determine a boundary of the focus region for the composite image based on a boundary of the feature window in the reference image.

With respect to such an apparatus, the imaging management module may determine a projected feature window based on the candidate displacement factor and the boundary of the feature window in the reference image for each image in the image array other than the reference image, generate the focus region for the composite image based on the feature window and the projected feature windows, determine a sharpness of the generated focus region, and determine the corresponding sharpness for the candidate displacement factor based on the sharpness of the generated focus region.

With respect to such an apparatus, the imaging management module may average pixel intensities of pixels in the feature window and the projected feature windows to generate the focus region.

With respect to such an apparatus, the imaging management module may generate the composite image based on the transformed image array.

With respect to such an apparatus, the imaging management module may determine one or more corresponding relative displacements based on the optimal displacement factor and a relative position of that image within the image array for each image in the image array and translate each image in the image array based on its one or more corresponding relative displacements.

With respect to such an apparatus, the imaging management module may determine a feature window in a reference image of a second image array based on the feature window in the reference image comprising one of the plurality of images in the image array using a motion tracking algorithm, determine a displacement factor for the second image array based on the feature window in the reference image of the second image array, filter the displacement factor for the second image array, and transform the second image array based on the filtered displacement factor for the second image array.

A method may comprise determining, by a processor circuit, a corresponding sharpness for each of a plurality of candidate displacement factors for an image array comprising a plurality of images, determining an optimal displacement factor comprising a candidate displacement factor corresponding to a maximized sharpness of a focus region for a composite image, and transforming the image array based on the optimal displacement factor to align regions of the plurality of images that correspond to the focus region.

Such a method may comprise determining a position of interest in a reference image comprising one of the plurality of images in the image array, determining a feature window in the reference image based on the position of interest, and determining the corresponding sharpness for each of the plurality of candidate displacement factors based on the feature window.

With respect to such a method, determining the feature window may comprise determining a feature window size by determining a smallest candidate feature window size for which a corresponding feature window contains a sufficient number of potential edge pixels.

Such a method may comprise determining a boundary of the focus region for the composite image based on a boundary of the feature window in the reference image.

With respect to such a method, determining the corresponding sharpness for a candidate displacement factor may comprise determining a projected feature window based on the candidate displacement factor and the boundary of the feature window in the reference image for each image in the image array other than the reference image, generating the focus region for the composite image based on the feature window and the projected feature windows, determining a sharpness of the generated focus region, and determining the corresponding sharpness for the candidate displacement factor based on the sharpness of the generated focus region.

With respect to such a method, generating the focus region for the composite image may comprise averaging pixel intensities of pixels in the feature window and the projected feature windows.

A system may comprise a processor circuit, a camera array comprising a plurality of cameras, and an imaging management module for execution on the processor circuit to determine a corresponding sharpness for each of a plurality of candidate displacement factors for an image array comprising a plurality of images corresponding to the plurality of cameras in the camera array, determine an optimal displacement factor comprising a candidate displacement factor corresponding to a maximized sharpness of a focus region for a composite image, and transform the image array based on the optimal displacement factor to align regions of the plurality of images that correspond to the focus region.

With respect to such a system, the imaging management module may determine a position of interest in a reference image comprising one of the plurality of images in the image array, determine a feature window in the reference image based on the position of interest, and determine the corresponding sharpness for each of the plurality of candidate displacement factors based on the feature window.

With respect to such a system, the imaging management module may determine a feature window size by determining a smallest candidate feature window size for which a corresponding feature window contains a sufficient number of potential edge pixels.

With respect to such a system, the imaging management module may determine a boundary of the focus region for the composite image based on a boundary of the feature window in the reference image.

With respect to such a system, the imaging management module may determine a projected feature window based on the candidate displacement factor and the boundary of the feature window in the reference image for each image in the image array other than the reference image, generate the focus region for the composite image based on the feature window and the projected feature windows, determine a sharpness of the generated focus region, and determine the corresponding sharpness for the candidate displacement factor based on the sharpness of the generated focus region.

With respect to such a system, the imaging management module may average pixel intensities of pixels in the feature window and the projected feature windows to generate the focus region.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. At least one non-transitory machine-readable medium comprising a plurality of instructions that, in response to being executed on a computing device, cause the computing device to:

determine a position of interest in a reference image of a two-dimensional (2D) image array comprising a plurality of images arranged into multiple rows and multiple columns, each image of the plurality of images to correspond to a respective camera of a plurality of cameras of a 2D camera array comprising the plurality of cameras arranged into multiple rows and multiple columns to correspond to the multiple rows and multiple columns of the image array, the reference image to comprise one of the plurality of images;

determine a primary feature of the position of interest;

determine a feature window position and a feature window size for a feature window in the reference image, the feature window position to be determined based on the position of interest, the feature window size to be determined based on the feature window position to generate a smallest feature window size based on a number of edge pixels and a proportion of pixels having depths significantly different from pixels of the primary feature, the feature window to exclude at least a portion of the reference image outside of the position of interest;

determine, based on the feature window, a corresponding sharpness for each of a plurality of candidate displacement factors for the 2D image array;

determine an optimal displacement factor comprising a candidate displacement factor corresponding to a maximized sharpness of a focus region for a composite image; and transform the image array based on the optimal displacement factor to align regions of the plurality of images that correspond to the focus region.

2. The at least one non-transitory machine-readable medium of claim 1, determining the feature window size to comprise determining the smallest candidate feature window size for which a corresponding feature window contains a sufficient number of potential edge pixels.

3. The at least one non-transitory machine-readable medium of claim 1, comprising instructions that, in response to being executed on the computing device, cause the computing device to determine a boundary of the focus region for the composite image based on a boundary of the feature window in the reference image.

4. The at least one non-transitory machine-readable medium of claim 3, determining the corresponding sharpness for a candidate displacement factor comprising:

determining a projected feature window based on the candidate displacement factor and the boundary of the feature window in the reference image for each image in the image array other than the reference image;

generating the focus region for the composite image based on the feature window and the projected feature windows;

determining a sharpness of the generated focus region; and determining the corresponding sharpness for the candidate displacement factor based on the sharpness of the generated focus region.

5. The at least one non-transitory machine-readable medium of claim 4, generating the focus region for the composite image comprising averaging pixel intensities of pixels in the feature window and the projected feature windows.

6. The at least one non-transitory machine-readable medium of claim 1, transforming the image array based on the optimal displacement factor comprising:

determining one or more corresponding relative displacements based on the optimal displacement factor and a relative position of that image within the image array for each image in the image array; and translating each image in the image array based on its one or more corresponding relative displacements.

7. The at least one non-transitory machine-readable medium of claim 1, comprising instructions that, in response to being executed on the computing device, cause the computing device to:

determine a feature window in a reference image of a second image array based on the feature window in the reference image comprising one of the plurality of images in the image array using a motion tracking algorithm;

determine a displacement factor for the second image array based on the feature window in the reference image of the second image array;

filter the displacement factor for the second image array; and transform the second image array based on the filtered displacement factor for the second image array.

8. The at least one non-transitory machine-readable medium of claim 2, the potential edge pixels representing a boundary of at least a portion of the position of interest.

9. The at least one non-transitory machine-readable medium of claim 2, the sufficient number of potential edge pixels comprising a number of pixels greater than or equal to an edge pixel minimum.

10. An apparatus, comprising:

a processor circuit; and an imaging management module for execution on the processor circuit to:

determine a position of interest in a reference image of a two-dimensional (2D) image array comprising a plurality of images arranged into multiple rows and multiple columns, each image of the plurality of images to correspond to a respective camera of a plurality of cameras of a 2D camera array comprising the plurality of cameras arranged into multiple rows and multiple columns to correspond to the multiple rows and multiple columns of the image array, the reference image to comprise one of the plurality of images;

determine a primary feature of the position of interest;

determine a feature window position and a feature window size for a feature window in the reference image, the feature window size to be determined based on the feature window position to generate a smallest feature window size based on a number of edge pixels and a proportion of pixels having depths significantly different from pixels of the primary feature, the feature window to exclude at least a portion of the reference image outside of the position of interest;

determine, based on the feature window, a corresponding sharpness for each of a plurality of candidate displacement factors for the 2D image array;

determine an optimal displacement factor comprising a candidate displacement factor corresponding to a maximized sharpness of a focus region for a composite image; and transform the image array based on the optimal displacement factor to align regions of the plurality of images that correspond to the focus region.

11. The apparatus of claim 10, determining the feature window size to comprise determining the smallest candidate feature window size for which a corresponding feature window contains a sufficient number of potential edge pixels.

12. The apparatus of claim 10, the imaging management module to determine a boundary of the focus region for the composite image based on a boundary of the feature window in the reference image.

13. The apparatus of claim 12, the imaging management module to:

determine a projected feature window based on the candidate displacement factor and the boundary of the feature window in the reference image for each image in the image array other than the reference image;

generate the focus region for the composite image based on the feature window and the projected feature windows;

determine a sharpness of the generated focus region; and determine the corresponding sharpness for the candidate displacement factor based on the sharpness of the generated focus region.

14. The apparatus of claim 13, the imaging management module to average pixel intensities of pixels in the feature window and the projected feature windows to generate the focus region.

15. The apparatus of claim 10, the imaging management module to:
determine one or more corresponding relative displacements based on the optimal displacement factor and a relative position of that image within the image array for each image in the image array; and
translate each image in the image array based on its one or more corresponding relative displacements.

16. The apparatus of claim 10, the imaging management module to:
determine a feature window in a reference image of a second image array based on the feature window in the reference image comprising one of the plurality of images in the image array using a motion tracking algorithm;
determine a displacement factor for the second image array based on the feature window in the reference image of the second image array;
filter the displacement factor for the second image array; and
transform the second image array based on the filtered displacement factor for the second image array.

17. The apparatus of claim 11, the potential edge pixels representing a boundary of at least a portion of the position of interest.

18. The apparatus of claim 11, the sufficient number of potential edge pixels comprising a number of pixels greater than or equal to an edge pixel minimum.

19. A method, comprising:
determining, by a processor circuit, a position of interest in a reference image of a two-dimensional (2D) image array comprising a plurality of images arranged into multiple rows and multiple columns, each image of the plurality of images corresponding to a respective camera of a plurality of cameras of a 2D camera array comprising the plurality of cameras arranged into multiple rows and multiple columns to correspond to the multiple rows and multiple columns of the image array, the reference image to comprise one of the plurality of images;
determining a primary feature of the position of interest;
determining a feature window position and a feature window size for a feature window in the reference image, the feature window size to be determined based on the feature window position to generate a smallest feature window size based on a number of edge pixels and a proportion of pixels having depths significantly different from pixels of the primary feature, the feature window to exclude at least a portion of the reference image outside of the position of interest;
determining, based on the feature window, a corresponding sharpness for each of a plurality of candidate displacement factors for the 2D image array;
determining an optimal displacement factor comprising a candidate displacement factor corresponding to a maximized sharpness of a focus region for a composite image; and
transforming the image array based on the optimal displacement factor to align regions of the plurality of images that correspond to the focus region.

20. The method of claim 19, determining the feature window size to comprise determining the smallest candidate feature window size for which a corresponding feature window contains a sufficient number of potential edge pixels.

21. The method of claim 19, comprising determining a boundary of the focus region for the composite image based on a boundary of the feature window in the reference image.

22. The method of claim 21, determining the corresponding sharpness for a candidate displacement factor comprising:
determining a projected feature window based on the candidate displacement factor and the boundary of the feature window in the reference image for each image in the image array other than the reference image;
generating the focus region for the composite image based on the feature window and the projected feature windows;
determining a sharpness of the generated focus region; and
determining the corresponding sharpness for the candidate displacement factor based on the sharpness of the generated focus region.

23. The method of claim 22, generating the focus region for the composite image comprising averaging pixel intensities of pixels in the feature window and the projected feature windows.

24. The method of claim 20, the potential edge pixels representing a boundary of at least a portion of the position of interest.

25. The method of claim 20, the sufficient number of potential edge pixels comprising a number of pixels greater than or equal to an edge pixel minimum.

26. A system, comprising:
a processor circuit;
a two-dimensional (2D) camera array comprising a plurality of cameras arranged into multiple rows and multiple columns; and
an imaging management module for execution on the processor circuit to:
determine a position of interest in a reference image of a 2D image array comprising a plurality of images arranged into multiple rows and multiple columns to correspond to the multiple rows and multiple columns of the camera array, each image of the plurality of images to correspond to a respective camera of the plurality of cameras in the 2D camera array, the reference image to comprise one of the plurality of images;
determine a primary feature of the position of interest;
determine a feature window position and a feature window size for a feature window in the reference image, the feature window size to be determined based on the feature window position to generate a smallest feature window size based on a number of edge pixels and a proportion of pixels having depths significantly different from pixels of the primary feature, the feature window to exclude at least a portion of the reference image outside of the position of interest;
determine, based on the feature window, a corresponding sharpness for each of a plurality of candidate displacement factors for the 2D image array;
determine an optimal displacement factor comprising a candidate displacement factor corresponding to a maximized sharpness of a focus region for a composite image; and transform the image array based on the optimal displacement factor to align regions of the plurality of images that correspond to the focus region.

27. The system of claim 26, determining the feature window size to comprise determining the smallest candidate feature window size for which a corresponding feature window contains a sufficient number of potential edge pixels.

28. The system of claim 26, the imaging management module to determine a boundary of the focus region for the composite image based on a boundary of the feature window in the reference image.

29. The system of claim 28, the imaging management module to:
  determine a projected feature window based on the candidate displacement factor and the boundary of the feature window in the reference image for each image in the image array other than the reference image;
  generate the focus region for the composite image based on the feature window and the projected feature windows;
  determine a sharpness of the generated focus region; and
  determine the corresponding sharpness for the candidate displacement factor based on the sharpness of the generated focus region.

* * * * *